US012794175B2

(12) United States Patent
Chen et al.

(10) Patent No.: US 12,794,175 B2
(45) Date of Patent: Nov. 10, 2026

(54) HIGH-SPEED CAGE ASSEMBLIES WITH ALIGNMENT STRUCTURES

(71) Applicant: Molex, LLC, Lisle, IL (US)

(72) Inventors: Lie Chen, Maumelle, AR (US); Matthew Wolfe, Conway, AR (US); Scott Sommers, Naperville, IL (US)

(73) Assignee: Molex, LLC, Lisle, IL (US)

( * ) Notice: Subject to any disclaimer, the term of this patent is extended or adjusted under 35 U.S.C. 154(b) by 302 days.

(21) Appl. No.: 18/276,457

(22) PCT Filed: Feb. 11, 2022

(86) PCT No.: PCT/IB2022/051236

§ 371 (c)(1),
(2) Date: Aug. 9, 2023

(87) PCT Pub. No.: WO2022/172213

PCT Pub. Date: Aug. 18, 2022

(65) Prior Publication Data

US 2024/0113473 A1 Apr. 4, 2024

Related U.S. Application Data

(60) Provisional application No. 63/148,627, filed on Feb. 12, 2021.

(51) Int. Cl.
*H01R 13/629* (2006.01)
*H01R 13/518* (2006.01)
(Continued)

(52) U.S. Cl.
CPC ......... *H01R 13/629* (2013.01); *H01R 13/518* (2013.01); *H01R 13/6583* (2013.01); *H01R 13/659* (2013.01)

(58) Field of Classification Search
CPC ................ H01R 13/518; H01R 13/629; H01R 13/6582; H01R 13/6583; H01R 13/659; H01R 13/6594
See application file for complete search history.

(56) References Cited

U.S. PATENT DOCUMENTS

| | | | | |
|---|---|---|---|---|
| 7,764,504 B2 * | 7/2010 | Phillips | ............. | H01R 13/6586 174/15.2 |
| 8,556,658 B2 * | 10/2013 | Szczesny | ............ | G02B 6/4278 439/607.2 |

(Continued)

FOREIGN PATENT DOCUMENTS

| | | |
|---|---|---|
| CN | 102646901 A | 8/2012 |
| CN | 103855543 A | 5/2014 |

(Continued)

OTHER PUBLICATIONS

International Preliminary Report on Patentability received for PCT Application No. PCT/IB2022/051236, mailed on Aug. 24, 2023, 08 pages.

(Continued)

*Primary Examiner* — Abdullah A Riyami
*Assistant Examiner* — Thang H Nguyen

(57) ABSTRACT

Alignment structures are included in high-speed data cage assemblies to prevent damage to one or more electronic components connected within the cage assembly and prevent misalignment of connected components. The alignment structures extend inwardly into a port and prevent movement of a module beyond the intended position of the module in a port. This allows connection between the module and a connector and prevents misalignment of the module. Damage to either the module or the connector by misalignment or by over-insertion of the module is prevented.

20 Claims, 18 Drawing Sheets

(51) Int. Cl.
*H01R 13/6583* (2011.01)
*H01R 13/659* (2011.01)

(56) References Cited

U.S. PATENT DOCUMENTS

| | | | | |
|---|---|---|---|---|
| 9,666,997 | B1 * | 5/2017 | Henry | H01R 13/659 |
| 10,396,513 | B2 * | 8/2019 | Regnier | H01R 12/721 |
| 2002/0025720 | A1 * | 2/2002 | Bright | G02B 6/4246 439/541.5 |
| 2003/0161108 | A1 | 8/2003 | Bright et al. | |
| 2007/0054551 | A1 * | 3/2007 | Malagrino, Jr. | H01R 13/645 439/607.01 |
| 2008/0019100 | A1 * | 1/2008 | Yang | H05K 9/0058 361/716 |
| 2011/0311188 | A1 * | 12/2011 | Wang | G02B 6/4201 385/94 |
| 2013/0034999 | A1 * | 2/2013 | Szczesny | G02B 6/4278 439/660 |
| 2019/0363496 | A1 * | 11/2019 | Suda | H01R 13/6583 |

FOREIGN PATENT DOCUMENTS

| | | | |
|---|---|---|---|
| CN | 210779303 | U | 6/2020 |
| CN | 211402845 | U | 9/2020 |
| CN | 211700636 | U | 10/2020 |
| EP | 1589618 | A1 | 10/2005 |
| EP | 2658043 | A2 | 10/2013 |
| JP | 2020038841 | A | 3/2020 |
| TW | 201101616 | A | 1/2011 |
| TW | M551366 | U | 11/2017 |
| TW | I716801 | B | 1/2021 |
| WO | 2010030620 | A2 | 3/2010 |

OTHER PUBLICATIONS

International Search Report and Written Opinion received for PCT Application No. PCT/IB2022/051236, mailed on May 19, 2022, 12 pages.

* cited by examiner

HIGH-SPEED CAGE ASSEMBLIES WITH ALIGNMENT STRUCTURES

CROSS-REFERENCE TO RELATED APPLICATION

This application is a U.S. National Phase Patent Application of International Patent Application No. PCT/IB2022/051236, filed on Feb. 11, 2022, which claims priority to U.S. Provisional Application 63/148,627 filed Feb. 12, 2021, both of which is are incorporated herein by reference in their entireties.

TECHNICAL FIELD

This disclosure relates to the field of connectors, and more specifically to connectors used in high-speed data applications.

INTRODUCTION

Existing assemblies for connecting high-speed data modules and high-speed connectors have their drawbacks.

Accordingly, it is desirable to provide assemblies that address the shortcomings of existing high-speed data assemblies.

SUMMARY

One connector assembly ("assembly") that is configured to support high-speed data signals (e.g., signals provided at 112 Gigabits per second (Gbps)) may comprise: a cage with a receptacle connector positioned therein, the cage comprising opposing sidewalls, where one or more of the opposing sidewalls comprises an alignment structure configured to restrict movement of a module; and further comprising a conductive base.

In embodiments, the alignment structure may be further configured to: (i) restrict movement of the module to prevent damage to the module and/or to the receptacle connector; and (ii) to prevent misalignment of the module.

Such an assembly may comprise a 1×1 or a 2×1 cage, where the latter includes a top port and a bottom port and either or both ports may be so configured.

In one embodiment, the at least one alignment structure may comprise a structure integral to one of the opposing sidewalls and may also comprise a portion that extends inward and away from one of the opposing sidewalls, wherein as the module moves from one end of the assembly towards an opposite end of the assembly the alignment structure restricts movement of the module towards the opposite end.

In another embodiment, an assembly may include more than one alignment structure. For example, an alignment structure may be provided on each opposing sidewall. In such an embodiment, each alignment structure for each opposing sidewall may be configured at a position at a same distance from one end of the assembly.

Some assemblies may include an opening in a sidewall of the cover. In such an embodiment, such an opening may be covered by a sidewall of the base to maintain electromagnetic shielding properties of the assembly.

In an embodiment, the module is a high-speed module, such as, without limitation, a pluggable module in a desired configuration, inserted into a first end of the cage, with the pluggable module being configured to mate with a receptacle connector positioned adjacent a second end of the cage.

The alignment structure may be positioned and shaped to apply a force to a portion of the module to restrict the module from moving while at the same time allowing the module to make connection with the receptacle connector to permit high-speed data signals to be transported from the module to the receptacle connector or vice-versa without damaging either component.

The alignment structures need not be positioned on a sidewall of an assembly cover. For example, in alternative embodiments a connector assembly that is configured to receive and protect electronic components that are transmitting or receiving high-speed data signals may comprise: a conductive base comprising a bottom wall that include an alignment structure configured to restrict movement of an inserted module, a receptacle connector, and side walls and a cover. The alignment structure may, if desired, comprise a structure integral to the bottom wall.

Similar to the embodiments above, in such alternative embodiments the at least one alignment structure may be further configured to: (i) restrict movement of the module to prevent damage to the module and/or to a receptacle connector, and/or (ii) to restrict movement of the module to prevent misalignment of the module, for example.

The alternative embodiments may comprise a 1×1 cage, or a 2×1 cage, or cages of other configurations such as 1×4 or 1×6 cages or the like.

The alignment structure of an alternative embodiment may comprise a portion that extends upward and away from the bottom wall, wherein as the module is inserted into a first end of the assembly, the alignment structure restricts movement of the module towards a second end opposite the first end.

The bottom wall may comprise an additional alignment structure. If so, the alignment structures may be configured at opposing edges of the bottom wall and at a position at a same distance from one end of the assembly to restrict movement of the module.

Similar to the first set of embodiments, in alternative embodiments a module may be inserted into a first end of the assembly and the receptacle connector may be positioned at a second end of the assembly.

The at least one alignment structure may be positioned and shaped to apply a force to a portion of the module to restrict the module from moving past a certain position while at the same time allowing each the module to make connection with the receptacle connector to permit high-speed data signals to be transported from the module to the receptacle connector or vice-versa without damaging either component.

In some embodiments the assemblies described above may be a lower port or an upper port of a larger 2×1 assembly. In an embodiment, the other port may comprise sidewalls, and at least one alignment structure integral to one of the sidewalls to restrict the movement of an inserted module. The alignment structure may be further configured to: (i) restrict movement of the module to prevent damage to the module and/or to a receptacle connector positioned in the other port; and/or (ii) to restrict movement of the module being inserted in the other to prevent misalignment of the module, for example.

The other port may further comprise one or more electromagnetic shielded and conductive plates, each plate configured to cover an opening in one of the sidewalls of the top port associated with the at least one alignment structure to maintain electromagnetic shielding properties of the other port.

In embodiments, the at least one alignment structure may comprise a portion that extends inward and away from one of the sidewalls.

The module positioned in a particular port may comprise any desirable module, including without limitation a Quad Small Form Factor Pluggable Double Density (QSFP-DD) module or some other type of module. In some embodiments, the top and bottom ports may be populated with different types of modules.

Continuing, the alignment structure may be positioned and shaped to apply a force to a portion of the module to restrict the module from moving past a certain point while at the same time allowing the module to make electrical connection with a receptacle connector to permit high-speed data signals to be transported between the module and the receptacle connector without damaging either top port component.

Similar to other embodiments, the alignment structures included in the other port, which could be a top port, need not be positioned on a sidewall. For example, the top port may comprise a base. Such a base may comprise an alignment structure integral to the base to: (i) restrict the movement of an inserted module to prevent damage to the inserted module and/or to a mating receptacle connector, and/or (ii) restrict movement of the module to prevent misalignment of the module.

The alignment structure of the top port may comprise a portion bent angularly upward and away from the base and an end portion parallel to a side wall of the top port.

The top port may include more than one alignment structure. For example, the base of the top port may further comprise an additional alignment structure. In an embodiment, each top port alignment structure may configured at an opposing edge of the base at a same distance from one end of the top port.

The top port alignment structure may be positioned and shaped to apply a force to a portion of the module inserted into the top port to restrict the module from moving past a certain position while at the same time allowing the module to make electrical connection with a mating receptacle connector to permit high-speed data signals to be transported therebetween without damaging either top port component.

In the description above we described a 1×1 assembly or a 2×1 assembly that combines a lower port and a top port each of which includes at least one alignment structure.

The inventors provide additional embodiments. For example, another connector cage assembly that is configured to receive and protect electronic components transmitting or receiving high-speed data signals may comprise: an electromagnetically shielded and conductive top port comprising opposing sidewalls, where one or more of the opposing sidewalls comprises at least one top port alignment structure integral to one of the sidewalls to restrict the movement of a module, configured similarly to alignment structures described above, and having benefits similar to those described above.

The top port may comprise one or more electromagnetic shielded and conductive plates, each plate configured to cover an opening in one of the sidewalls of the top port associated with the at least one alignment structure to maintain electromagnetic shielding properties of the top port.

The at least one alignment structure may comprise a portion that extends inwardly and away from one of the sidewalls. Further, the at least one top port alignment structure may be positioned and shaped to apply a force to a portion of the module to restrict the module from moving beyond a certain point while at the same time allowing the module to make connection with a receptacle connector to permit high-speed data signals to be transported from the module to the receptacle connector or vice-versa without damaging either the module or the receptacle connector. This alignment structure may be positioned on the bottom wall of the base of the top port.

The at least one alignment structure may, or, may not be integral to the base. As before such an alignment structure may be further configured to: (i) restrict movement of the module to prevent damage to the module and/or to the receptacle connector, and/or (ii) restrict movement of the module to prevent misalignment of the module, for example.

The alignment structure may comprise a portion that is bent angularly upward and away from the base and an end portion parallel to a side wall of the top port.

The base of such a top port may include more than one alignment structure (i.e., an additional alignment structure). If so, each alignment structure may be configured at an opposing edge of the base at a same distance from one end of the top port.

In embodiments, the alignment structure may be positioned and shaped to apply a force to a portion of the module to restrict the module from moving while at the same time allowing the module to make connection with the receptacle connector to permit high-speed data signals to be transported from the module to the receptacle connector or vice-versa without damaging either component.

In an embodiment the top port may be an upper port of a 2×1 cage.

The top port may be combined with an electromagnetically shielded and conductive lower port, where the lower port also comprises at least one alignment structure configured to restrict movement of a lower port module.

BRIEF DESCRIPTION OF THE DRAWINGS

The present disclosure is illustrated by way of example and not limited to the accompanying figures in which like reference numerals may refer to similar elements and in which.

DETAILED DESCRIPTION, INCLUDING EXEMPLARY EMBODIMENTS

Simplicity and clarity in both illustration and description are sought to effectively enable a person of skill in the art to make, use, and best practice embodiments disclosed herein in view of what is already known in the art. One skilled in the art will appreciate that various modifications and changes may be made to the specific embodiments described herein without departing from the spirit and scope of the disclosure. Thus, the specification and drawings are to be regarded as illustrative and exemplary rather than restrictive or all-encompassing, and all such modifications to the specific embodiments described herein are intended to be included within the scope of the disclosure. Yet further, unless otherwise noted, features disclosed herein may be combined together to form additional combinations that were not otherwise described or shown for purposes of brevity.

It should also be noted that one or more exemplary embodiments may be described and/or illustrated as a method or process. Although a method or process may be described and/or illustrated as an exemplary sequence (i.e., sequential), unless otherwise noted the steps in the sequence may also be performed in parallel, concurrently or simultaneously. In addition, the order of each formative step within a method or process may be re-arranged. A described and/or illustrated method or process may be terminated when completed, and may also include additional steps that are not described and/or illustrated if, for example, such steps are known by those skilled in the art.

As used herein the terms "high-speed" and "high-data rate" may be used interchangeably. As used herein, the term "embodiment" or "exemplary" mean an example that falls within the scope of the disclosure.

As described in more detail herein and as illustrated in the figures, the inventors have discovered inventive high-speed, connector assemblies ("assembly" or "cage assembly"). We begin by describing embodiments of 1×1 cage assemblies and then describe embodiments of 2×1 cage assemblies. Each embodiment of an exemplary 2×1 cage assembly may include an embodiment of an exemplary 1×1 cage assembly as a lower port, for example. Said another way, an exemplary 1×1 cage assembly may be used as a lower port of an exemplary 2×1 cage assembly, for example.

Figure 1:
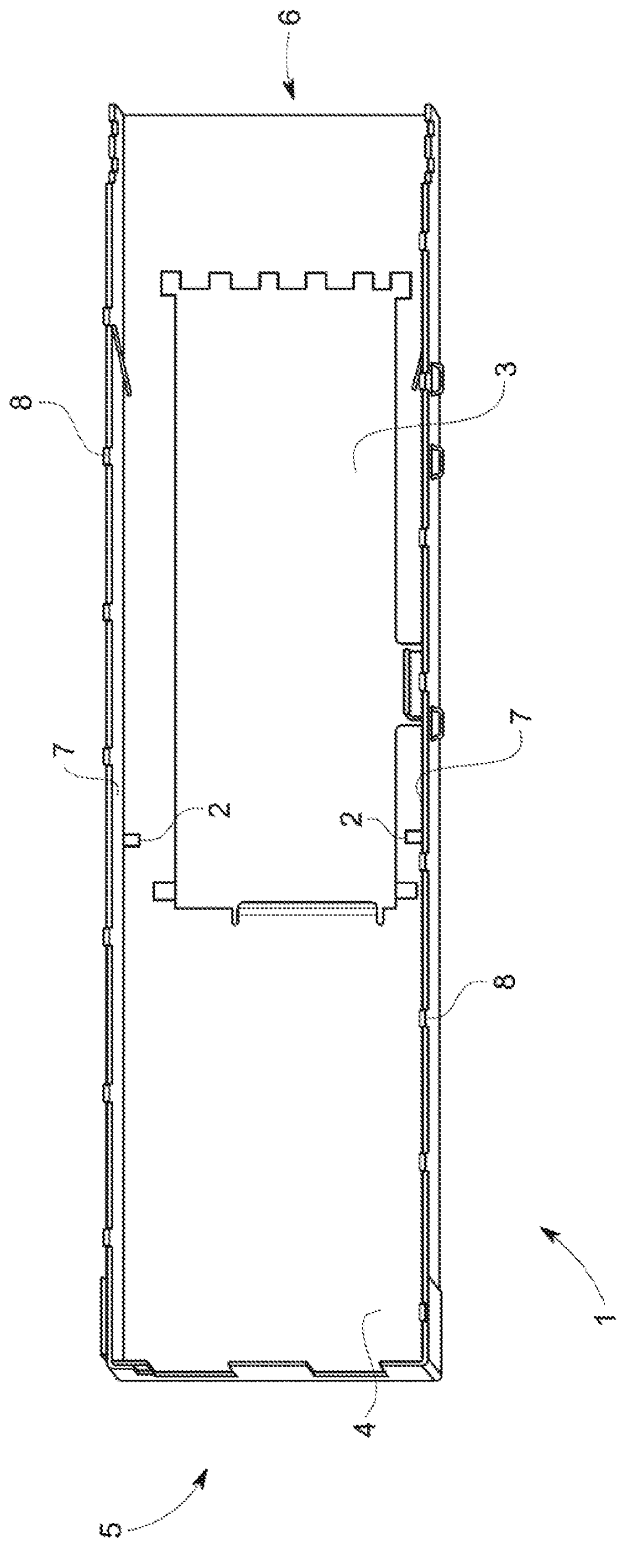
FIG. 1 illustrates an exemplary top cover for an electronic connector cage assembly.
Figure 10:
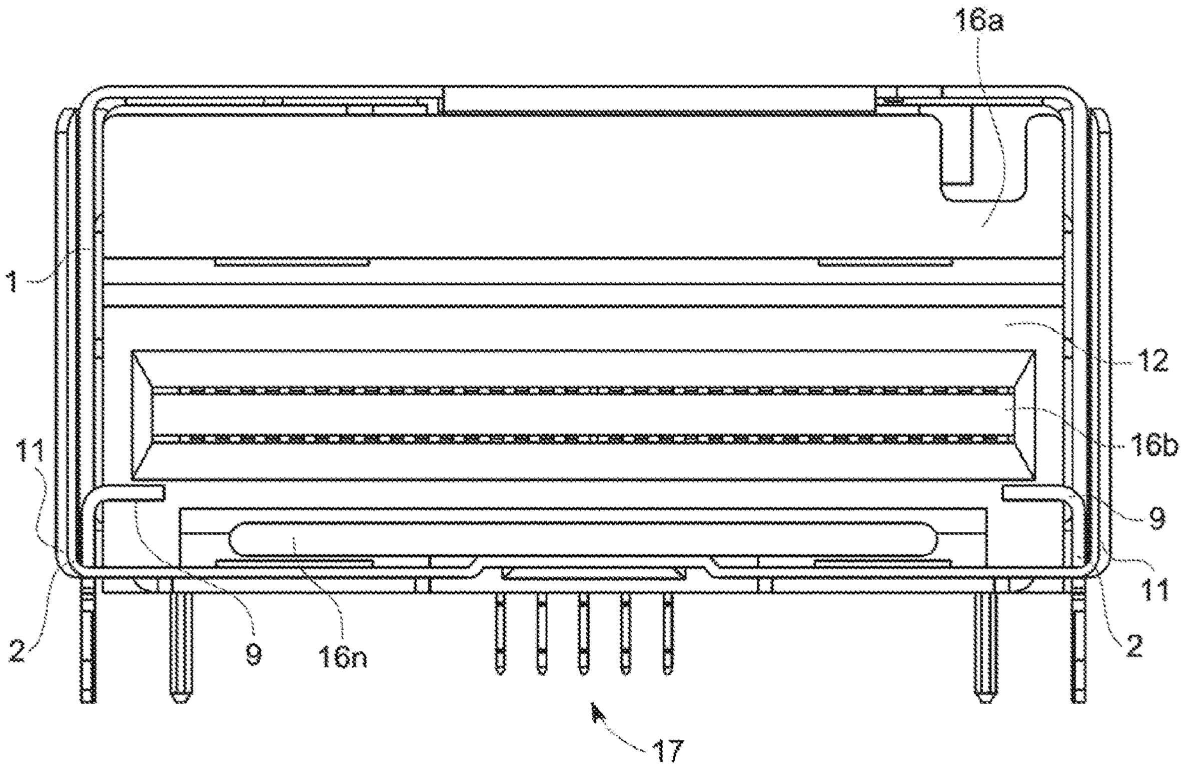
FIG. 10 depicts an enlarged end view of a module, receptacle connector and exemplary alignment structures.

Referring to FIG. 1 there is depicted an exemplary electromagnetically shielded and conductive cover 1 (that may be made of, for example, stainless steel) that forms one part of an electromagnetically shielded and conductive connector sleeve or cage assembly (e.g., a 1×1 cage assembly, or as a lower port of a 2×1 cage assembly) that is configured to receive and protect interconnected components that are transmitting and receiving high-speed data signals (e.g., signals conducting data up to at least 112 Gigabits per second (Gbps))(see FIG. 10 for a view of a 1×1 cage assembly 17). The assembly is configured to shield interior electronic components from electromagnetic interference, among other things.

The cover 1 may be configured as a top cover, for example. The cover 1 may include an opening 3 in a top wall 4 to allow heatsink contact with components such as the backshell of an inserted module.

As shown, cover 1 may comprise one or more alignment structures 2 (e.g., tabs) configured to align, and/or at least assist in the alignment of, one or more electrical components, such as electronic modules (not shown) that may be inserted into one end (e.g., "first" end 5) of the cover 1 of the assembly towards an opposite end (e.g., "second" end 6).

In one embodiment, the alignment structures 2 may be configured to limit or restrict (collectively "restrict") the movement of an inserted component (such as a module) such that as a component (or a portion of a component) moves from one end towards an opposite end within sidewalls 7 of the cover 1 of the assembly, the alignment structures 2 restrict the movement of the component to prevent damage to the module and/or to a receptacle connector because of over-insertion, and/or to prevent misalignment of the module. As described more fully elsewhere herein, the restriction of such a component may involve restricting the movement of a portion of a moving or inserted component past the structures 2, which causes the entire component to stop moving.

In an embodiment, the structures 2 may be integral to, or connected to (e.g., by welds), side walls 7 of the cover 1 that extend into a port of the assembly (perpendicularly from edges of top wall 4, for example).

Figure 2:
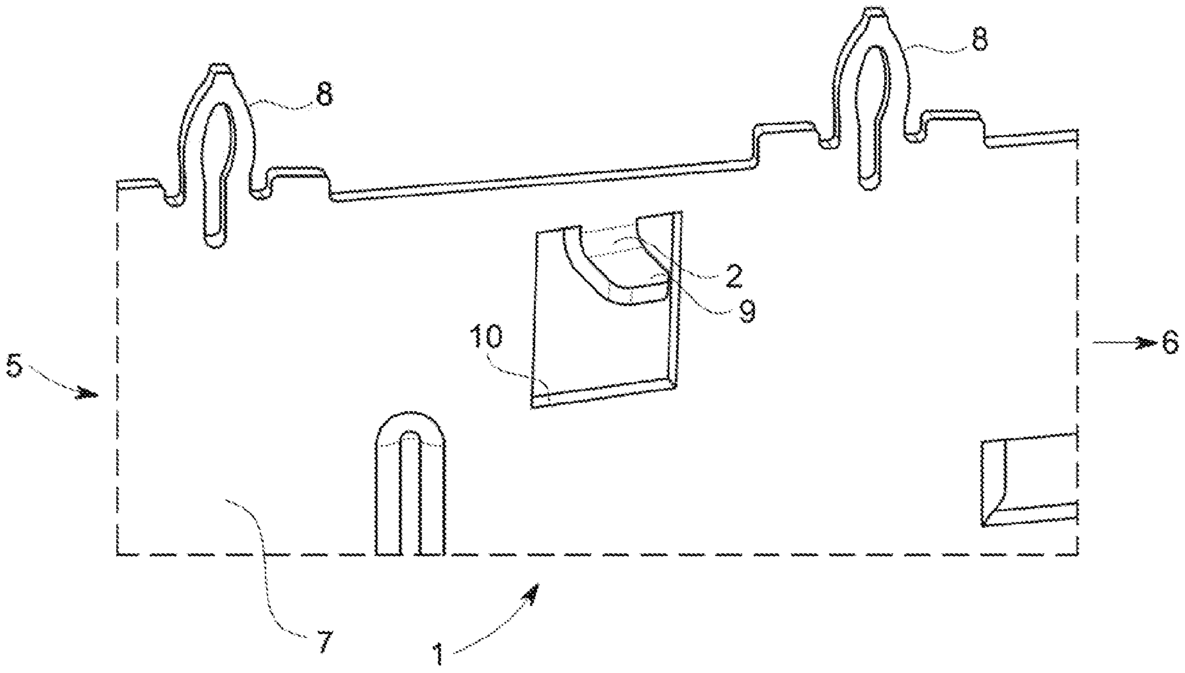
FIG. 2 illustrates an enlarged view of an exemplary alignment structure as part of a sidewall.
Figure 3:
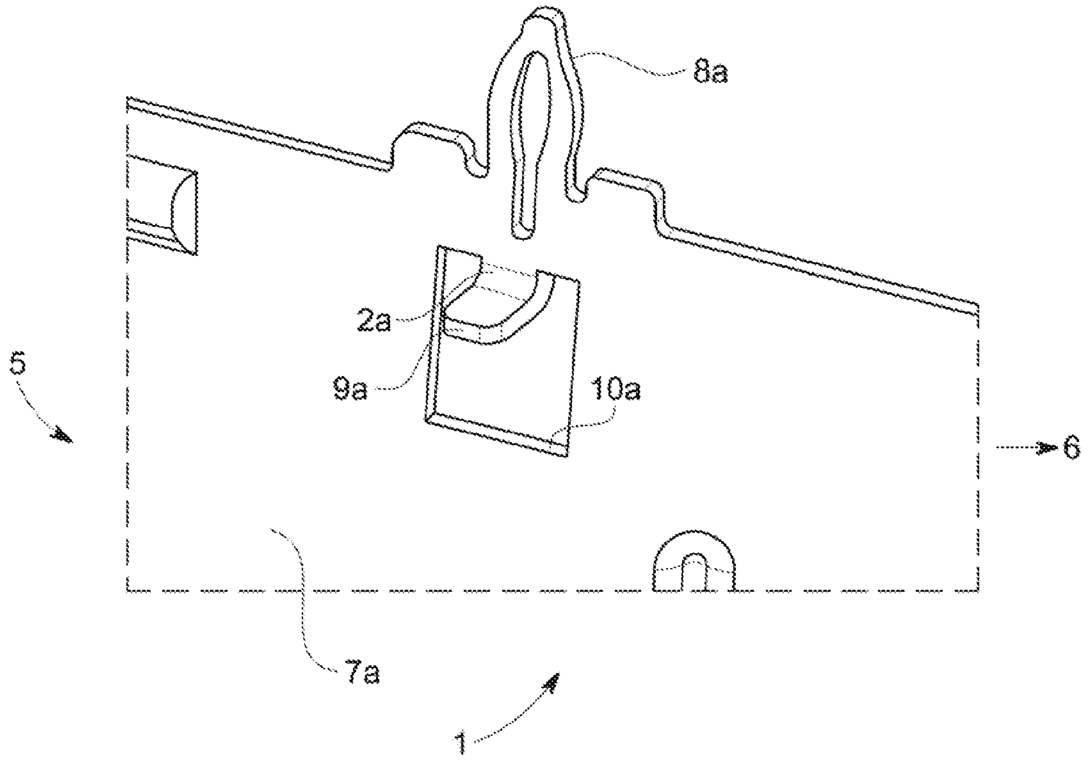
FIG. 3 illustrates another enlarged view of an additional, exemplary alignment structure as part of a sidewall.

Referring now to FIGS. 2 and 3, there are depicted enlarged views of exemplary, respective alignment structures 2, 2*a* of a cover 1 (e.g., for a 1×1 assembly). In both figures, the alignment structures 2, 2*a* are shown as structures integral to a sidewall 7, 7*a* though this is merely exemplary. In sum, in one embodiment the cover 1 may further comprise sidewalls 7,7*a*, where one or more of the sidewalls 7,7*a* may comprise at least one of the one or more integral alignment structures 2, 2*a*.

Further, each structure 2, 2*a* is shown comprising a portion 9, 9*a* that extends or is bent inward and away from a sidewall 7, 7*a*, though again, this is merely exemplary. In an embodiment, one or more of the structures 2,2*a* may be bent inward (i.e., less than all of the structures 2,2*a* may be so bent to form portion 9,9*a* or all of the structures 2,2*a* may be so bent to form a portion 9,9*a*).

Thus, as an electrical component such as a module moves (e.g., is inserted) from one (e.g., end 5) towards an opposite end (e.g., end 6) within respective sidewalls it will encounter a structure 2, 2*a* and be prevented from further movement towards the opposite end.

While only one alignment structure 2, 2*a* is depicted in FIGS. 2, 3 it should be understood that a cover 1 may include more than one structure that is similarly configured. For example, each opposing sidewall (see sidewalls 7 in FIG. 1) may include at least one alignment structure. In an embodiment, each of the alignment structures for each opposing sidewalls may be configured at a position on the cover 1 at a same distance from the one end (e.g., first end 5) of the assembly, for example, such that a moving component encounters the restricting force of both alignment structures at substantially the same time (again, see FIG. 1).

Also shown in FIGS. 2 and 3 are connecting, flexible protrusions 8, 8*a* and sidewall openings 10, 10*a*. In an embodiment, protrusions 8, 8*a* may be configured in a shape to be inserted through a base and into a printed circuit board (PCB), for example into a plated hole in the PCB in order to connect the cover to the base or bottom cover and the PCB.

A sidewall opening 10, 10*a* in a respective sidewall 7, 7*a* may be configured to have dimensions that allow a tool or machine to be inserted therein in order to extend or bend an alignment structure 2, 2*a* inward to form portion 9,9*a*. Said another way, in an embodiment, an alignment structure 2, 2*a* may be in a same geometric plane as a sidewall (i.e., flat, not bent) when manufactured integral to a sidewall 7, 7*a*. Thus, a structure 2, 2*a* would appear as filling a portion of an opening 10, 10*a*. Thereafter, a tool (or machine) may be used to bend structure 2,2*a* inward, for example. Similarly, when a structure 2, 2*a* is not integral, an opening 10, 10*a* may be provided to allow a tool enough space to connect a structure 2, 2*a* to a sidewall 7, 7*a* for example.

In FIG. 2, the cover 1 includes an alignment structure 2 at a different position from end 5 (or 6) than a protrusion 8 while in FIG. 3 the cover 1 includes an alignment structure 2*a* at the same position from end 5 (or 6) as a protrusion 8*a*.

Figure 4:
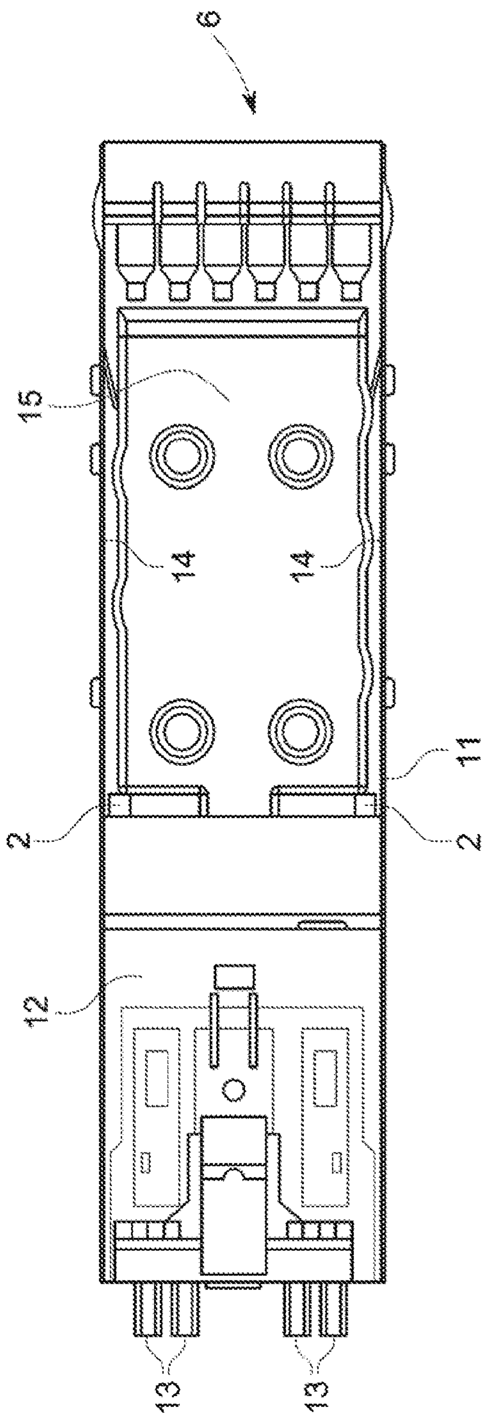
FIG. 4 illustrates an exemplary base or bottom cover for an electronic connector cage assembly with a receptacle connector in one end.

FIG. 4 illustrates an exemplary electromagnetically shielded and conductive base or bottom cover 11 (collectively "base," which may be made of, for example, stainless steel) of an electromagnetically shielded and conductive connector cage assembly, for use with a cover 1 with an electronic component 12 inserted or received therein. In more detail, a component 12 (e.g., a receptacle connector with twinax cables 13) may be positioned at or near a first end 5 of the base 11.

Also shown in FIG. 4 are the alignment structures 2. Though shown in FIG. 4, it should be understood that, in one embodiment, the alignment structures 2 are integral to, or connected to, the cover 1 and not the base 11. Thus, the structures 2 in FIG. 4 are shown in order to provide the reader with the relative position of the structures 2 with respect to the base 11 (i.e., the position of the structures 2 as if the cover 1 was attached to the base 11).

Alternatively, the base 11 may also include one or more alignment structures (for example tabs or shaped blocking structures, which may be made of, for example, stainless steel) positioned as shown in FIG. 4 that are configured to align, and/or at least assist in the alignment of, one or more electrical components such as a module.

When the structures 2 are part of the base 11 the structures 2 may be integral to, or connected to (e.g., by welds) sidewalls 14 of the base 11 that extend perpendicular from edges of bottom wall 15 of the base 11, for example.

Figure 6:
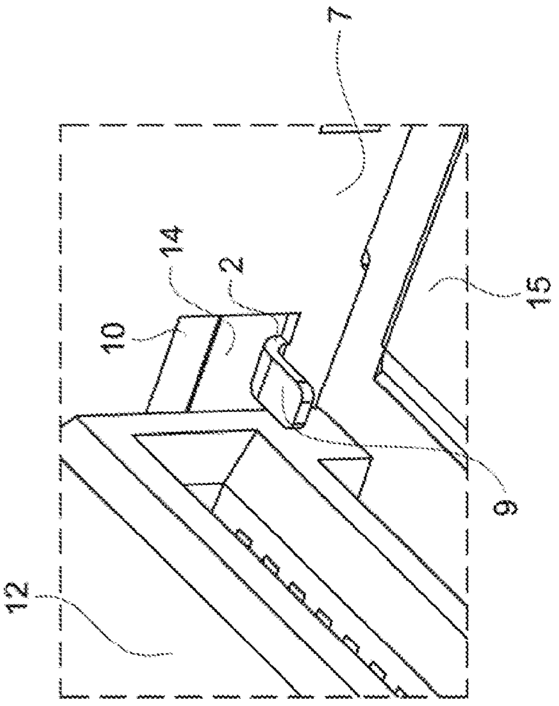
FIG. 6 depicts an enlarged view of an additional, exemplary alignment structure.
Figure 5:
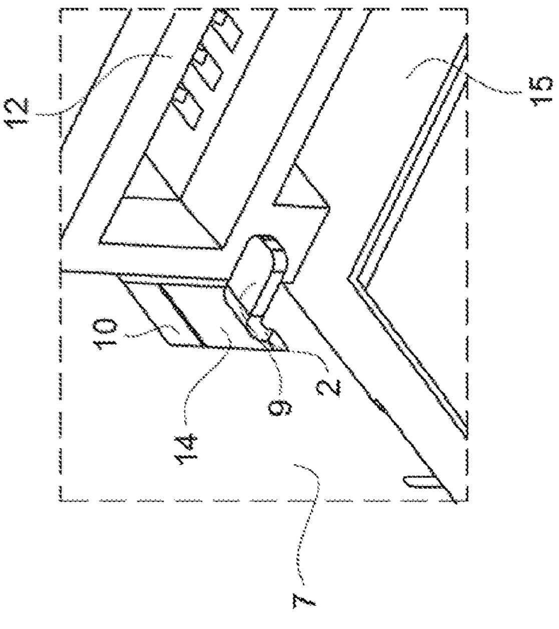
FIG. 5 depicts an enlarged view of an exemplary alignment structure.

Referring now to FIGS. 5 and 6, there are depicted enlarged views of a sidewall 7 of the cover 1 within sidewalls 14 of the base 11 and over a bottom wall 15 of the base 11. In both figures, at least one alignment structure 2 is shown configured as integral to sidewall 7 though this is merely exemplary. Further, at least one alignment structure 2 is shown comprising a portion 9 that extends or is bent inwards and away from sidewall 7, though again, this is merely exemplary.

While only one alignment structure 2 is depicted in FIGS. 5, 6 it should be understood that a cover 1 (and/or base 11) may include more than one structure that is similarly configured. For example, each opposing sidewall (see sidewalls 7 in FIG. 1) may include at least one alignment structure 2. In an embodiment, each of the alignment structures 2 may be configured at a position on opposing sidewalls of the same cover at a same distance from the first end 5, for example, such that the moving component 12 encounters the restricting force of both alignment structures 2 at substantially the same time (see FIG. 1).

Also, as shown in FIGS. 5 and 6, each opening 10 may be covered by a sidewall 14 of the base 11 in order to maintain the electromagnetic shielding properties of the assembly 17.

Figure 7:
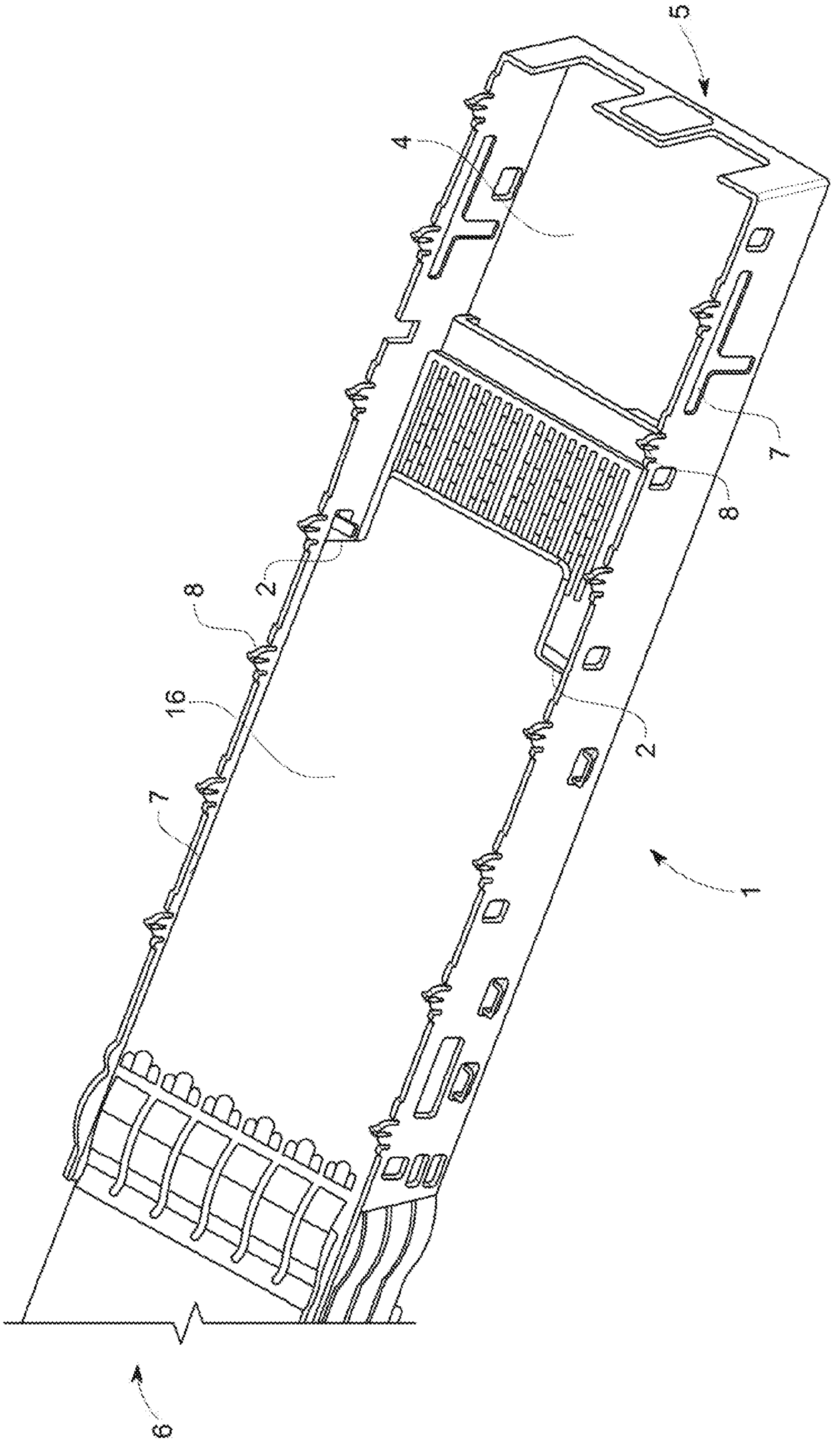
FIG. 7 depicts an exemplary cover with module inserted in one end.

Referring now to FIG. 7 there is depicted the exemplary cover 1 with a module 16 now inserted therein (connector 12 is not shown for the sake of comparison). The module 16 may be a Quad Small Form Factor Pluggable Double Density (QSFP-DD) module or other suitable module. In an embodiment, upon insertion of the module 16 into end 6 of the cover 1 the alignment structures 2 may be configured to restrict the movement of the module 16, such that as the module 16 moves from end 6 towards opposite end 5 within the sidewalls 7 of the cover 1, the alignment structures 2 restrict the module 16 from moving past the structures 2 towards end 5.

Figure 8:
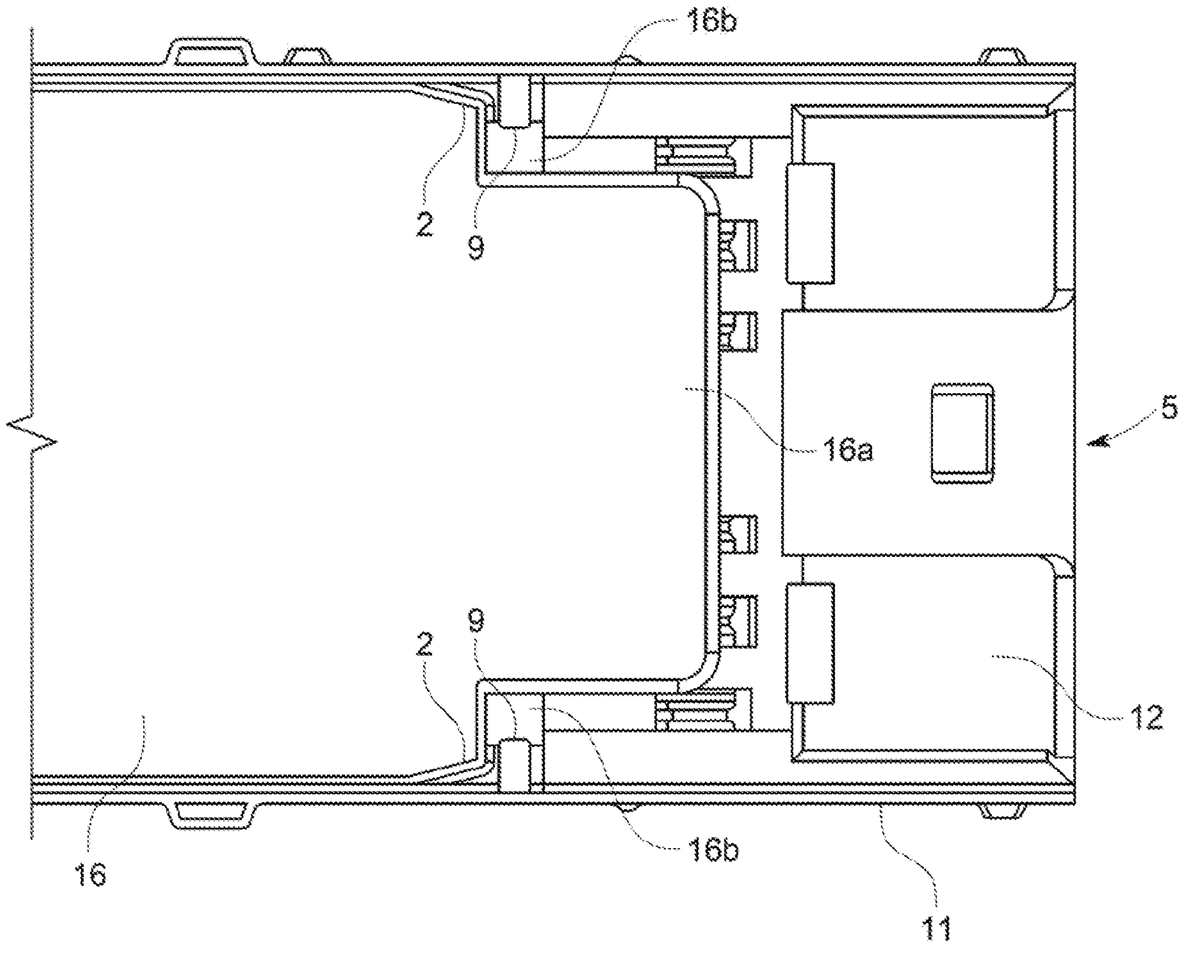
FIG. 8 depicts an enlarged view of a module, receptacle connector and exemplary alignment structures.
Figure 9:
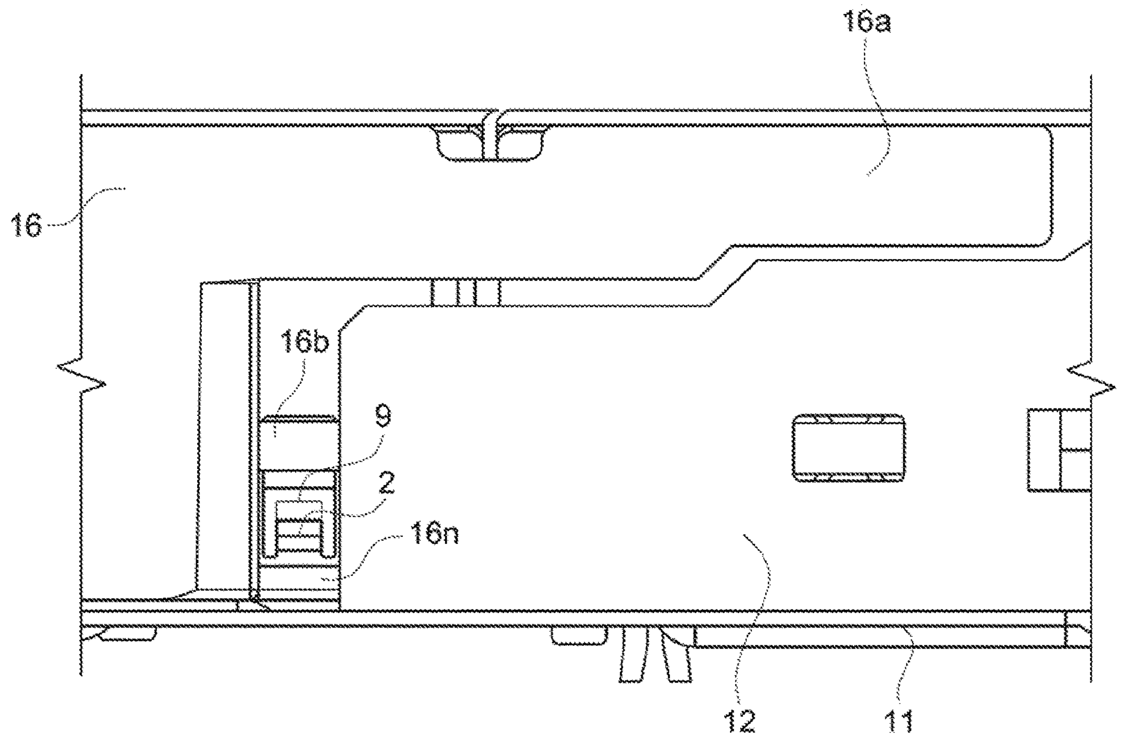
FIG. 9 depicts an enlarged side view of a module, receptacle connector and exemplary alignment structures.

FIGS. 8 and 9 depict top and side views, respectively, of the module 16, connector 12 and alignment structures 2 while FIG. 10 depicts a front edge view of module 16 and receptacle connector 12 within exemplary cage assembly 17. As shown exemplary cage assembly 17 comprises a cover 1 and base 11, where the cover 1 includes one or more alignment structures 2.

Figure 11:
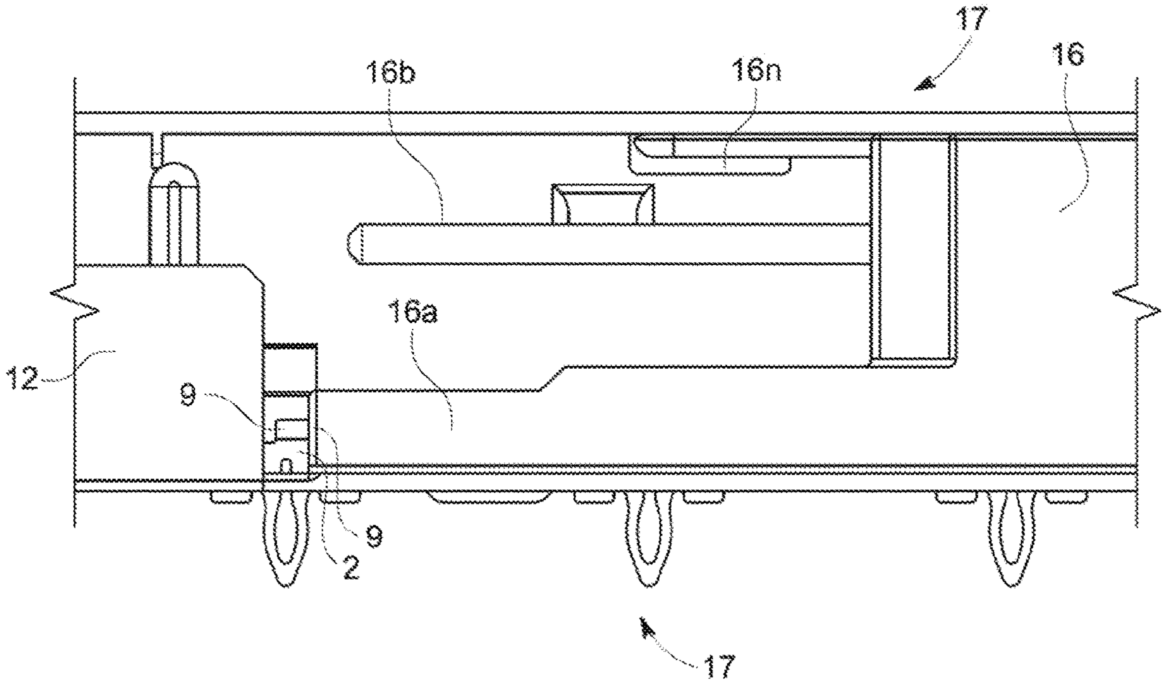
FIG. 11 depicts a side view of an exemplary alignment structure of a cage assembly that may prevent damage to a receptacle connector as a module is incorrectly inserted into the assembly.

An existing module 16 may be shaped to include a number of extending portions 16*a*, 16*b* to 16*n* (see FIG. 11 also). Accordingly, in an embodiment, the alignment structures 2 may be positioned and shaped on cover 1 to apply a force to a portion of module 16 (and/or connector 12) that restricts the module 16 from moving while at the same time allowing each extending portion 16*a*, 16*b* to 16*n* to make sufficient connection with the connector 12 to permit high-speed data signals to be transported from module 16 to connector 12 (or vice-versa) without damaging the connector 12. In more detail, structures 2 may be positioned and shaped as a part of cage assembly 17 such that structures allow module 16 (a module) to make sufficient connection with the connector 12 (a second electronic component) but restricts module 16 from moving too far towards connector 12 to prevent damage to the connector 12, or module 16 for example.

Up until now our discussion has assumed that an electronic component (e.g., module) is inserted correctly within a cage assembly 17 that comprises both a cover 1 and base 11. However, in practice electronic components may be inserted incorrectly. If so, the components will most likely be misaligned which, in turn, will prevent an appropriate electrical connection to be made between a module and connector. To prevent such misalignments an assembly may include one or more of the inventive alignment structures described herein, such as structures 2.

Figure 12:
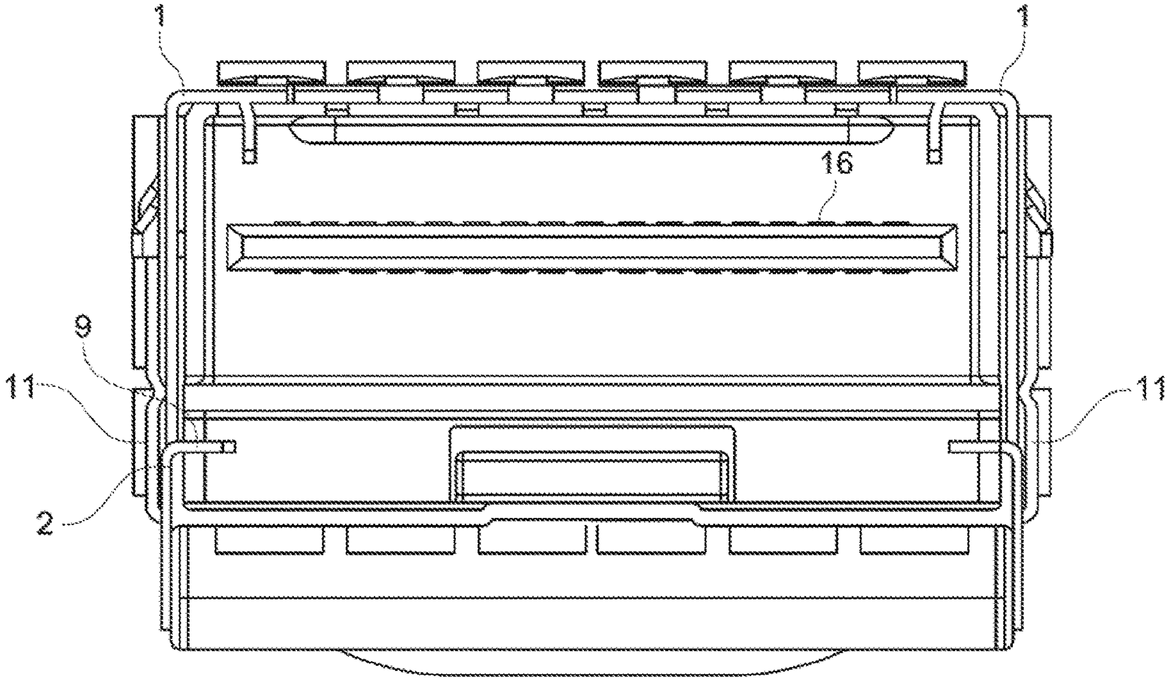
FIG. 12 depicts an edge view of an exemplary alignment structure of a cage assembly that may prevent damage to a receptacle connector as a module is incorrectly inserted into the assembly.
Figure 13:
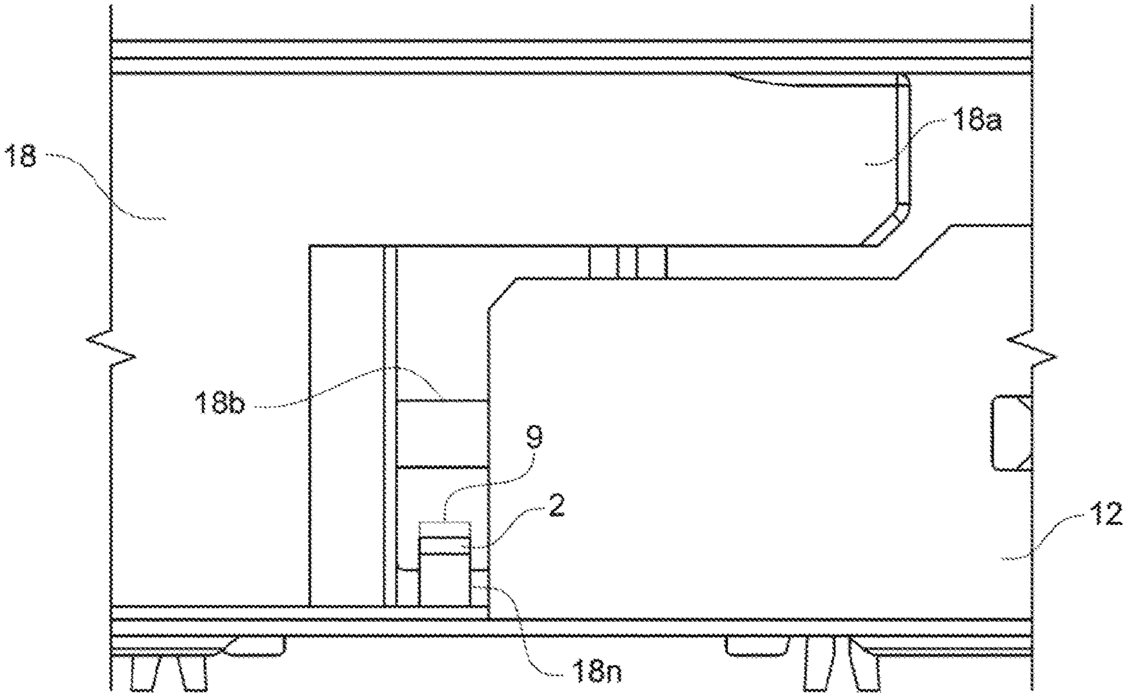
FIG. 13 depicts a side view of an exemplary alignment structure of an assembly that may prevent damage to a receptacle connector as a module is inserted into the assembly.

For example, FIGS. 11 and 12 depict a module 16 that has been inserted into cage assembly 17 incorrectly (i.e., upside down). This may lead to damage to connector 12. However, because cage assembly 17 (e.g., a 1×1 cage assembly) includes one or more alignment structures 2 on a cover 1 (or base 11) the misaligned module 16 is restricted from moving past structures 2, thus damage to the receptacle connector 12 may be averted.

Accordingly, in an embodiment, the alignment structures 2 may be positioned and shaped on a cover to apply a force to a portion of module 18 that restricts the module 18 from moving while at the same time allowing each extending portion 18*a*, 18*b* to 18*n* to make electrical connection with the connector 12 to permit high-speed data signals to be transported from module 18 to connector 12 (or vice-versa) without damaging the connector 12. In more detail, structures 2 may be positioned and shaped as a part of cage assembly 17 such that structures allow module 18 (a module) to make sufficient connection with the connector 12 (a second electronic component) but restricts module 18 from moving too far towards connector 12 to prevent damage to the connector 12, for example.

Figure 14:
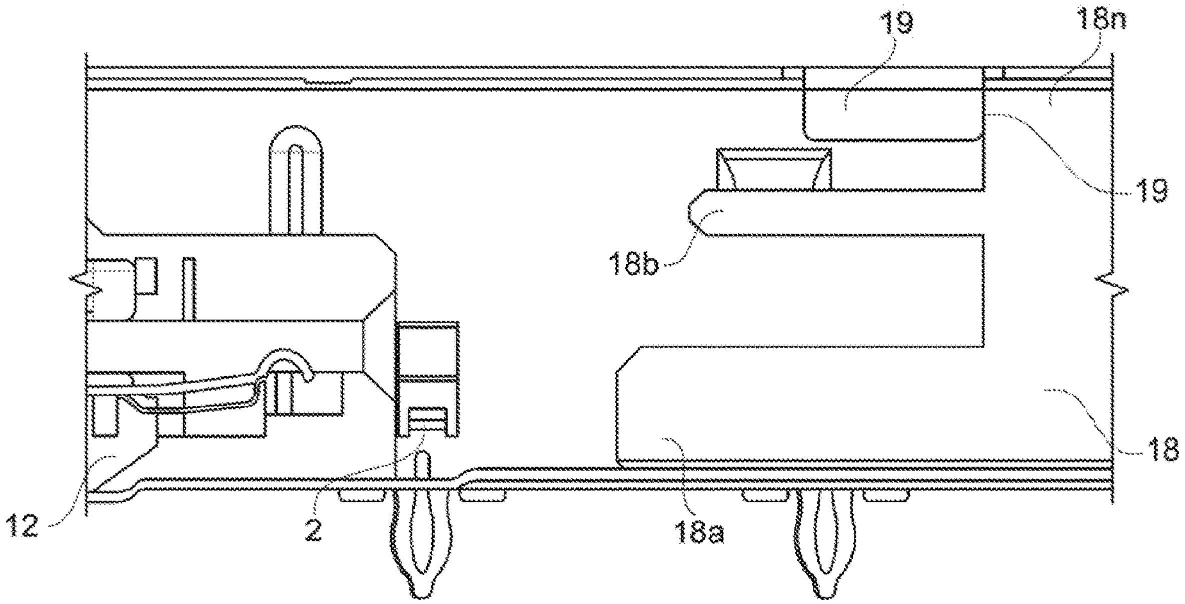
FIG. 14 depicts a side view of an exemplary alignment structure of an assembly that may prevent damage to a receptacle connector as a module is incorrectly inserted into the assembly.
Figure 15:
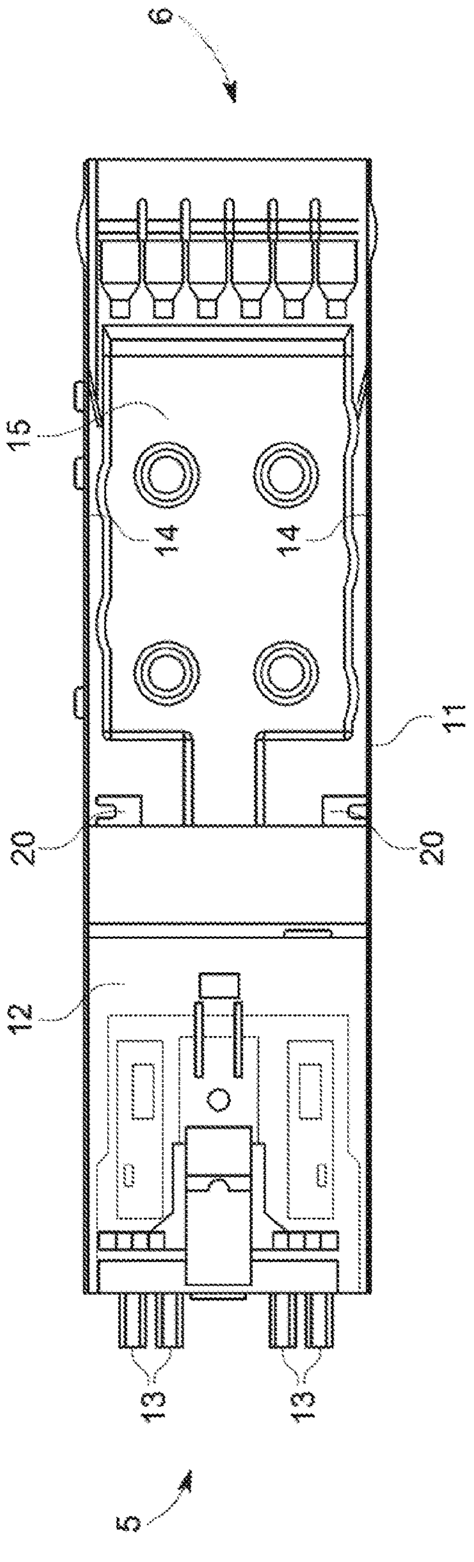
FIG. 15 depicts a view of one or more alignment structures as part of a bottom wall.

FIG. 14 also depicts a module 18, connector 12 and alignment structure 2 within an electromagnetic, shielded and conductive cage assembly 17. However, in FIG. 14 the module 18 has been inserted into the cage assembly 17 incorrectly (e.g., upside down). Accordingly, in an embodiment, an inversion prevention structure 19 may be positioned and shaped on a cover to prevent the module 18 from being inserted upside-down.

In FIGS. 1 to 14 the alignment structures are depicted as being positioned and shaped as part of a sidewall of a cover. However, such structures may be positioned and shaped as a part of the bottom wall of a base or as a part of a top wall of the cover. For example, in alternative embodiments FIGS. 15 to 19 depict a base 11 comprising one or more alignment structures 20 being a positioned and shaped as part of a bottom wall 15 of a base 11 of the cage assembly 17 (e.g., a 1×1 cage assembly or as a lower port of a 2×1 cage assembly). In embodiments the structures 20 may, or may not be, integral to the bottom wall of a base.

As shown in FIGS. 15 to 19, base 11 may comprise one or more alignment structures 20 (e.g., tabs or a shaped blocking structures made of, for example, stainless steel) configured to align, and/or at least assist in the alignment of a module that may be inserted at one end and move towards a second, opposite end.

In one embodiment, the one or more alignment structures 20 may be configured to restrict the movement of a module such that as module moves from end 6 of the assembly towards an opposite end 5 of the assembly the alignment structures 20 restrict the movement of the module from moving past the structures 20 towards the opposite end 5.

In an embodiment, the structures 20 may be integral to, or connected to (e.g., by welds) bottom wall 15 of the base 11.

Figure 16:
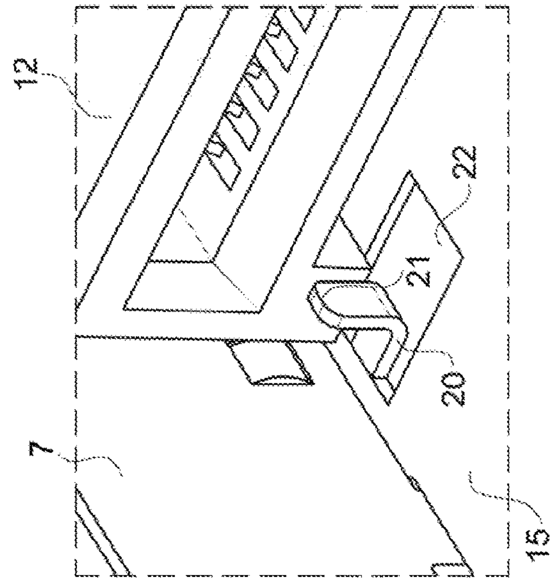
FIG. 16 depicts an enlarged view of one or more alignment structures as part of a bottom wall.
Figure 17:
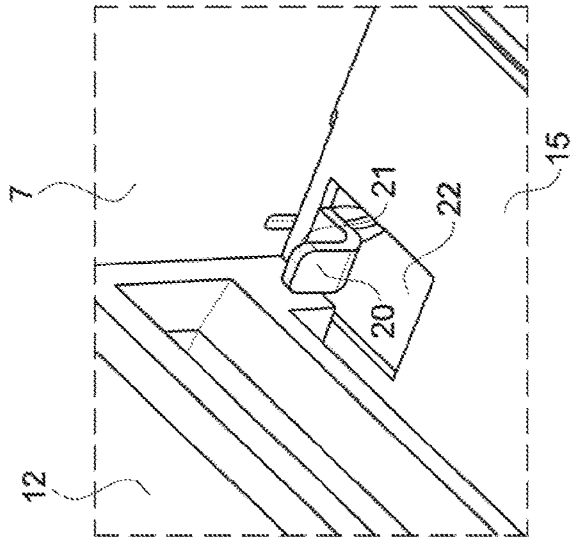
FIG. 17 depicts an enlarged view of one or more additional alignment structures as part of a bottom wall.

Referring now to FIGS. 16 and 17 there are depicted enlarged views of exemplary, respective alignment structures 20 of a respective cage assembly 17 (e.g., 1×1 cage assembly or as a lower port of a 2×1 cage assembly). In both figures, the alignment structures 20 are shown configured as integral to bottom wall 15 though this is merely exemplary. Further, each structure 20 is shown comprising a portion 21 that extends or is bent upward and away from bottom wall 15, though again, this is merely exemplary. Thus, as a module moves (e.g., is inserted) from end 6 towards end 5 (again, or vice-versa) it will encounter one or structures 20 and be prevented from further movement towards an opposite end 5.

While only one alignment structure 20 is depicted in FIGS. 16, 17 it should be understood that a respective base 11 may include more than one structure that is similarly configured (an “additional” structure). Accordingly, each of the structures 20 may be configured at opposing edges of the bottom wall 15 of the base 11 (i.e., where the bottom wall 15 meets sidewall 14 of the base 11, see FIG. 14) and at a position on such an opposing edge that is the same distance from the one end (e.g., first end 5), for example, such that a moving component encounters the restricting force of both alignment structures at substantially the same time (again, see FIG. 14).

Also shown in FIGS. 16, 17 are base openings 22. In an embodiment, each opening 22 may be configured to have dimensions that allow a tool or machine to be inserted therein in order to extend or bend an alignment structure 20 upwards to form portion 21. Said another way, in an embodiment, an alignment structure 20 may be in a same geometric plane as the bottom wall 15 (i.e., flat, not bent) when manufactured integral to the bottom wall 15. Thus, a structure 20 would appear as filling a portion of an opening 22. Thereafter, a tool (or machine) may be used to bend structure 20 inward, for example. Similarly, when a structure 20 is not integral, an opening 22 allows a tool enough space to connect a structure 20 to the bottom wall 15, for example.

Similar to embodiments described above, the moving components restricted by the structures 20 (for example, the exact qualities of specific modules) may vary.

Figure 18:
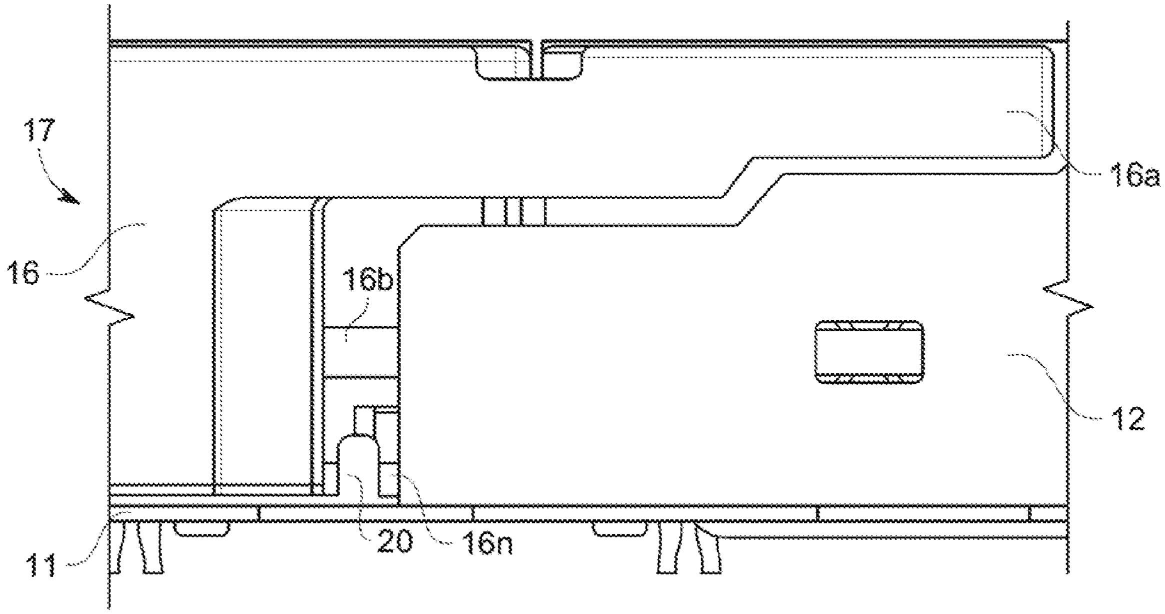
FIG. 18 depicts a side view of one or more alignment structures as part of a bottom wall as a module is inserted into the assembly.

In more detail referring now to FIG. 18 there is depicted a side view of a module 16 and receptacle connector 12 in an exemplary cage assembly 17 (e.g., a 1×1 cage assembly or as a lower port of a 2×1 cage assembly) that includes one or more alignment structures 20. The 16 may be shaped to include a number of extending portions 16*a*, 16*b* to 16*n*. Accordingly, in an embodiment, the alignment structures 20 may be positioned and shaped to apply a force to a portion of module 16 that restricts the module 16 from moving while at the same time allowing each extending portion 16*a*, 16*b* to 16*n* to make sufficient connection with the receptacle connector 12 to permit high-speed data signals to be transported from module 16 to connector 12 (or vice versa) without damaging the connector 12 or the module 16.

Figure 19:
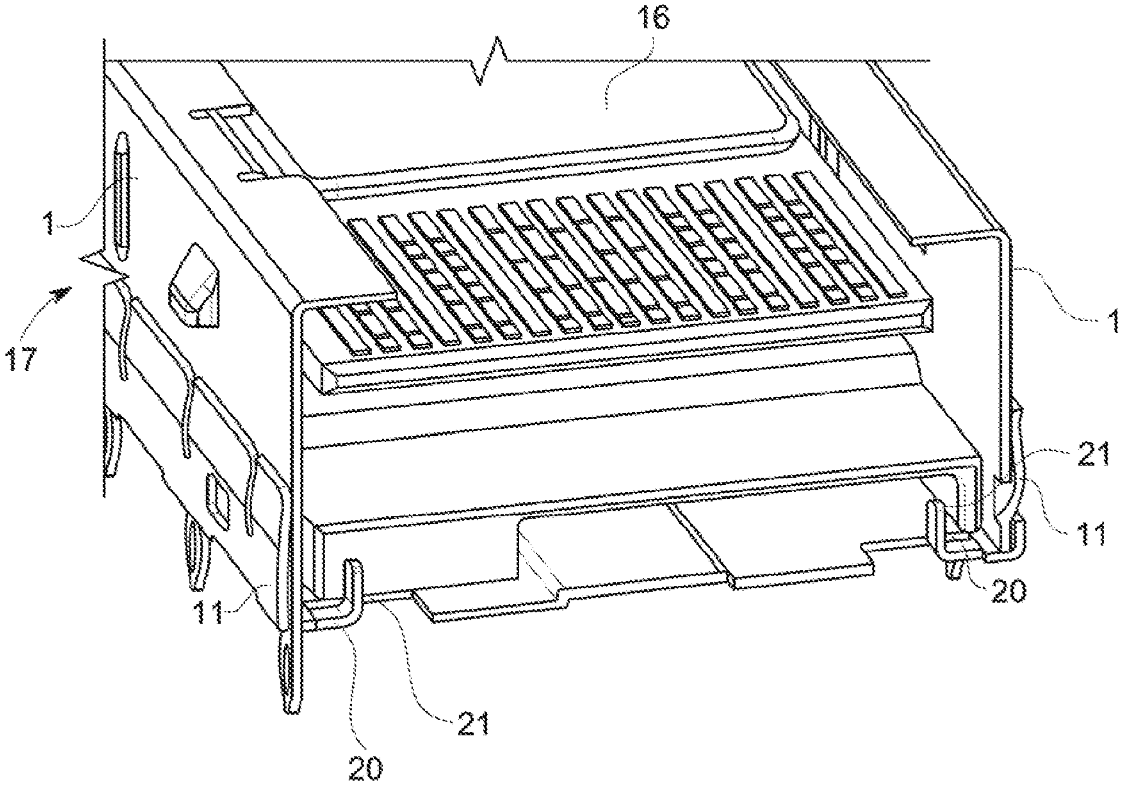
FIG. 19 depicts an edge view of one or more alignment structures as part of a bottom wall as a module is incorrectly inserted into the assembly.

While FIG. 18 depicts module 16 inserted correctly, FIG. 19 depicts a cut-a-way view of the same module inserted incorrectly (i.e., upside down). Such an incorrect insertion will mostly likely lead to a misalignment of module and connector. To prevent such misalignments the cage assembly 17 may include one or more of the inventive alignment structures described herein, such as structures 20. Accordingly, because cage assembly 17 includes one or more alignment structures 20 the misaligned module 16 is restricted from moving past structures 20, thus damage to the connector 12 (not shown in FIG. 19) and/or module may be averted.

In FIG. 19, the left alignment structure 20 restricts the movement of the module 16 while the right structure 20 does not. However, depending on the shape and structure of another electronic component the opposite may occur (the right alignment structure 20 would restrict movement of a module while the left structure would not). Alternatively, one or more of the structures (e.g., both structures, all structures) may restrict the movement of a module or another electronic component depending on the shape and structure of another electronic component.

The previously described and illustrated embodiments involve a 1×1 cage assembly. However, the inventive features described herein are not limited to a 1×1 cage assembly. For example, similar adjustment structures may be incorporated into 2×1 sleeves or cage assemblies (collectively "assemblies" or "cage assemblies"), 4×1 assemblies, n×1 assemblies (where "n" indicates the number of ports in an assembly).

Figure 20:
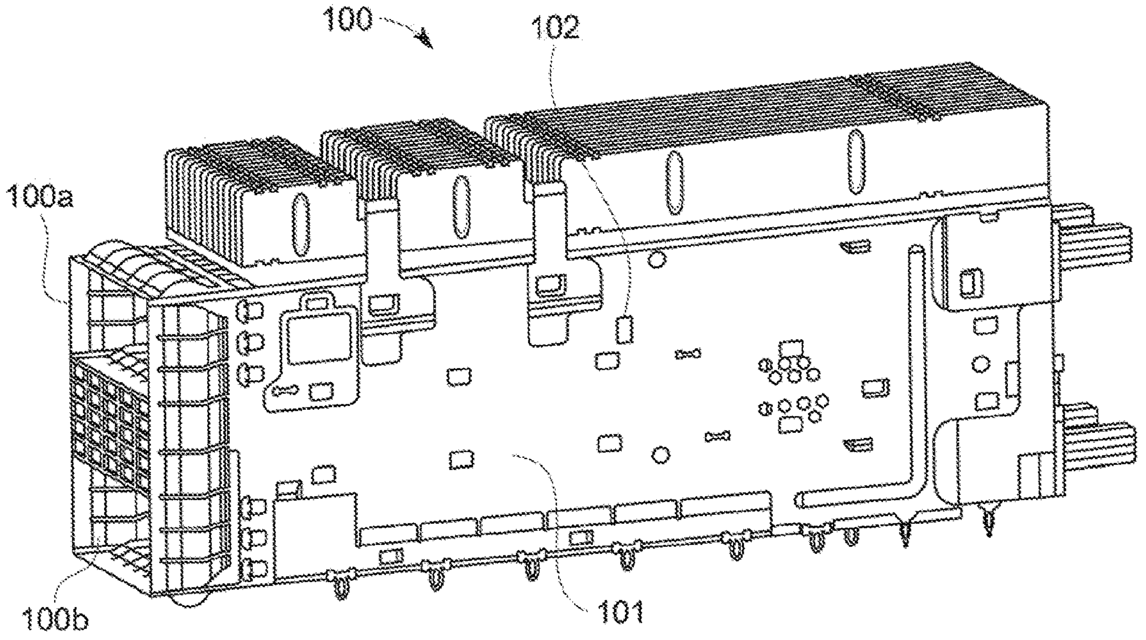
FIG. 20 depicts one side of an alternative, exemplary cage assembly comprising one or more alignment structures.
Figure 21:
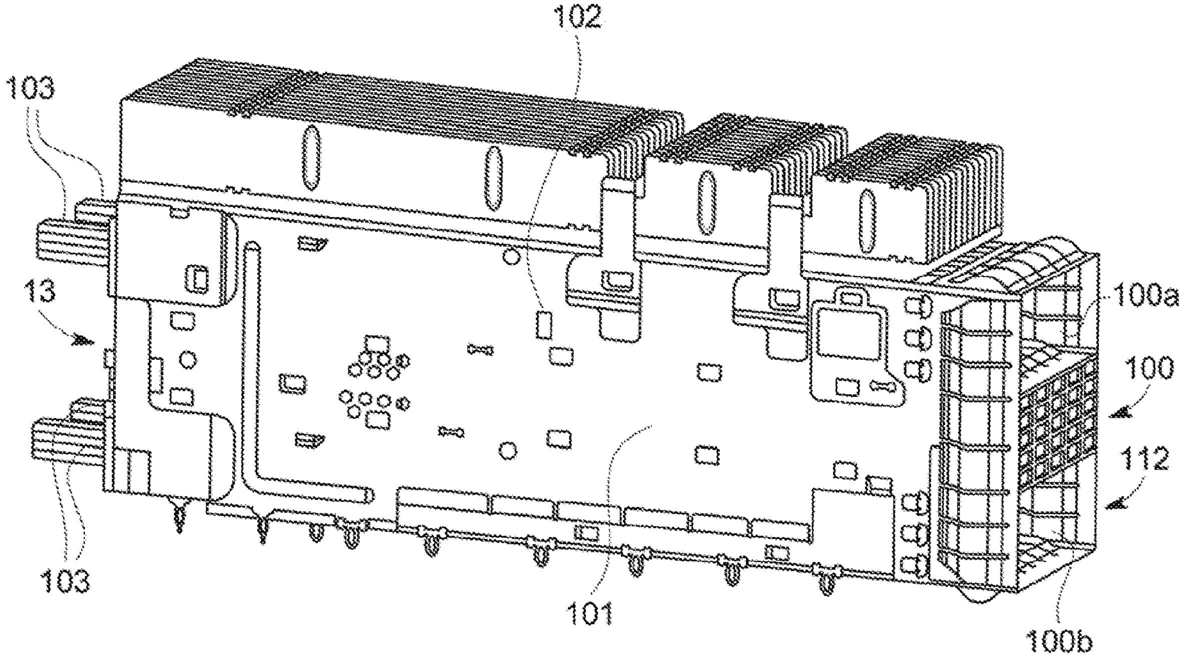
FIG. 21 depicts the opposite side of the alternative, exemplary cage assembly comprising one or more alignment structures shown in FIG. 20.

Referring to FIGS. 20 and 21 there is depicted an exemplary 2×1 electromagnetically shielded and conductive, connector cage assembly 100 ("assembly" for short) comprising a first or top port 100*a* and a second or lower/bottom port 100*b*, each port configured to contain and protect interconnected components (e.g., module connected to a connector) that are transmitting and receiving high-speed data signals (e.g., signals supporting a data transfer speed of 112 Gbps). In embodiments, the lower port 100*b* may comprise a structure identical to, or similar to, the inventive, exemplary 1×1 cage assemblies described previously and illustrated in FIGS. 1 to 19, for example. Accordingly, we will focus our attention on the top or upper port 100*a* (hereafter "top" port).

As shown, top port 100*a* may comprise sidewalls, and at least one top port alignment structure (e.g., tabs, a shaped blocking structure) integral 102 to one of the sidewalls to restrict the movement of a first, top port module as well as align, or at least assist in the alignment of the top port module.

In one embodiment, the top port alignment structures 102 may be configured to restrict the movement of an inserted module such that as the module moves from one end towards an opposite end within top port 100*a*, the alignment structures 102 restrict the movement of the module and prevent damage to the module and/or a connector similarly to as described herein above.

In an embodiment, the structures 102 may be integral to, or connected to (e.g., by welds) side walls 101 of the top port 100*a* (sidewalls of the top port cover), for example.

Figure 22:
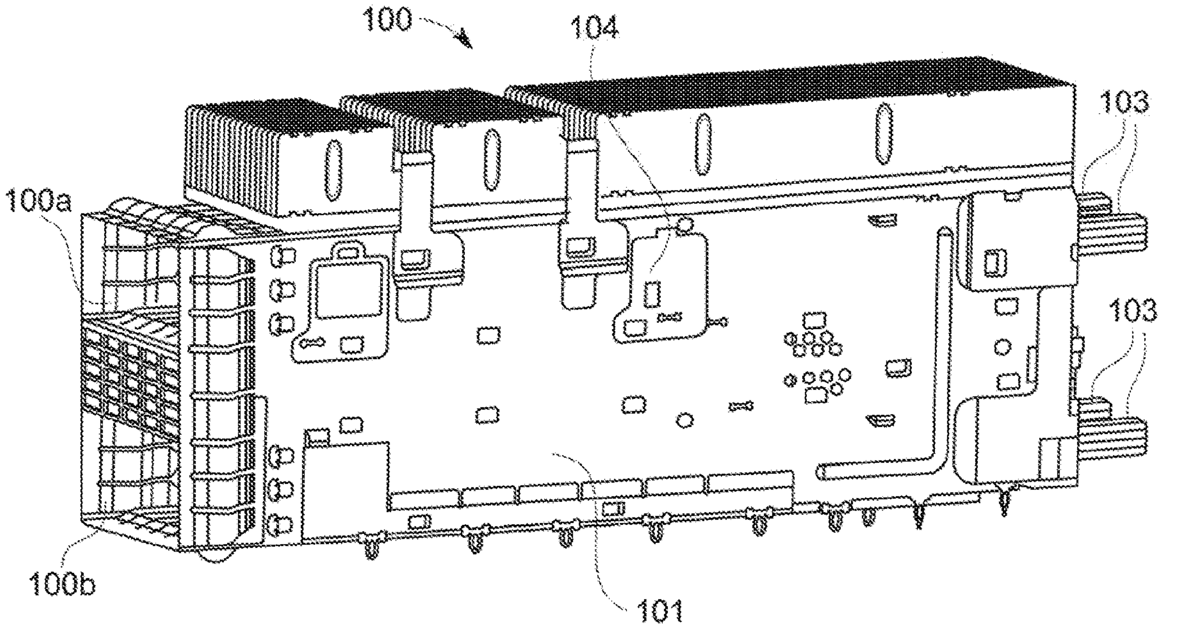
FIG. 22 depicts one side view of an exemplary assembly that includes shielded plates.
Figure 23:
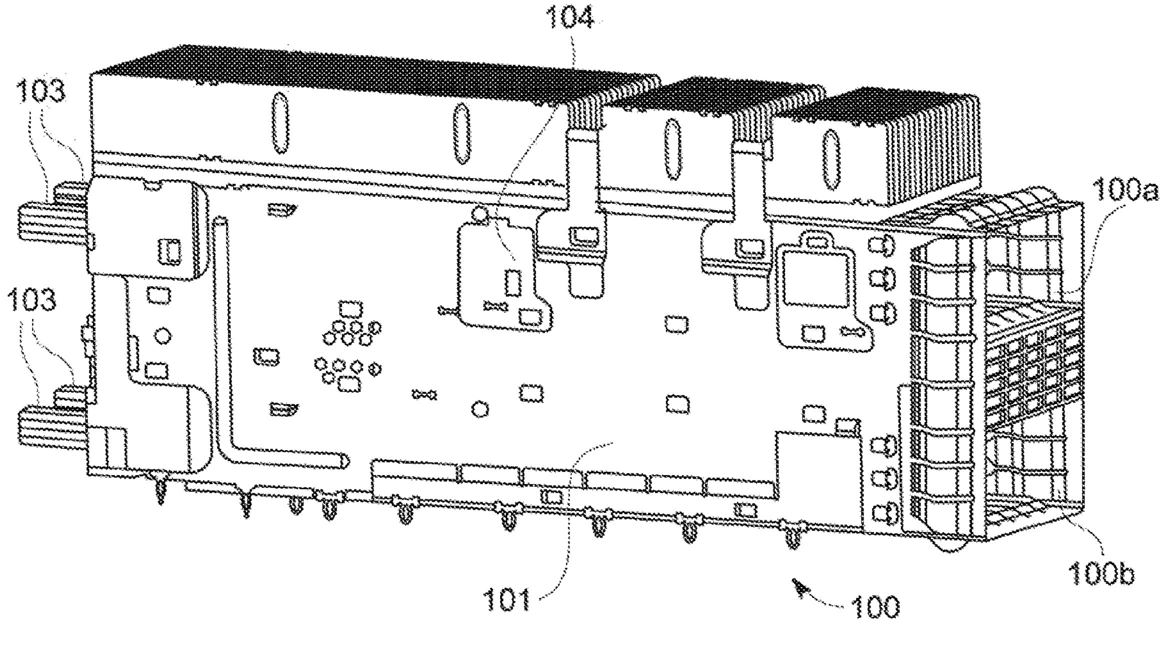
FIG. 23 depicts the opposite side view of the exemplary assembly shown in FIG. 22 that also includes shielded plates.

FIGS. 22 and 23 depict additional views of the exemplary cage assembly 100. As shown, the assembly 100 may include one or more electromagnetic shielded and conductive plates 104, where each plate may be configured to cover and seal an opening in one of the sidewalls 101 of the top port 100*a* (see elements 107 in FIGS. 24 and 25) associated with at least one alignment structure 102 in order to maintain the electromagnetic shielding properties of the top port 100*a*. In embodiments, the plates 104 may be configured as a metal plate, or as a copper tape, or a conductive, skinned dielectric laminate to name a few non-limiting examples. Alternatively, instead of a plate 104 positioned on the exterior of sidewall 101 a plate 104 may be configured as a conductively plated bung or stopper on the interior of the sidewall 101 to cover and seal an opening. In more detail, one exemplary bung may be composed of a conductive skin. Still further, another exemplary bung may be composed of a polymeric and permeable material (ferrites, nickel, iron, aluminum flakes) for example that absorb electromagnetic and radio frequency signals.

Figure 24:
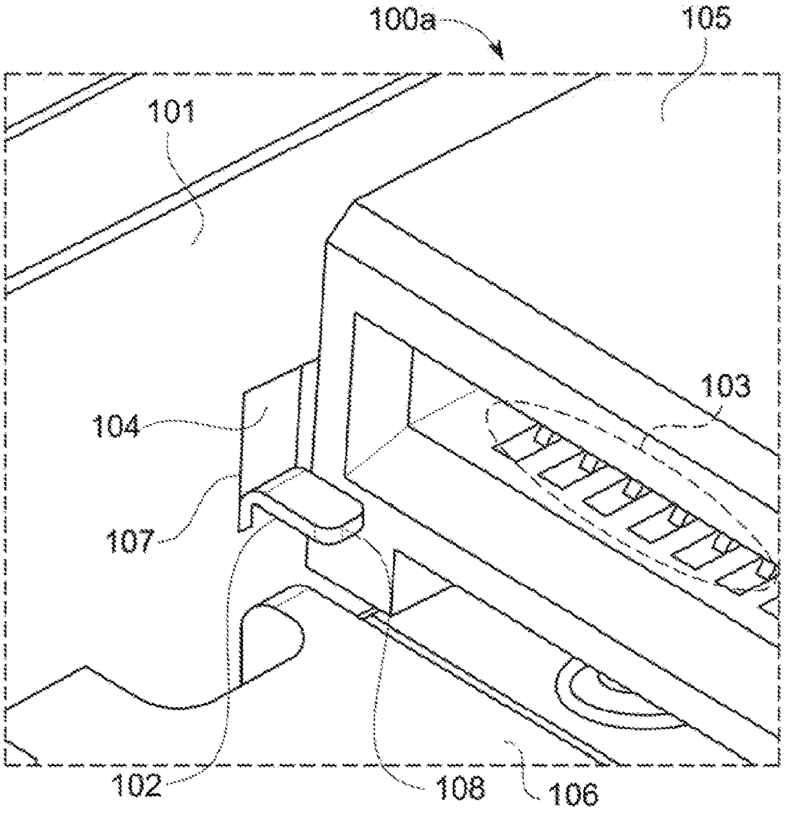
FIG. 24 depicts an enlarged view of an exemplary, respective alignment structure.
Figure 25:
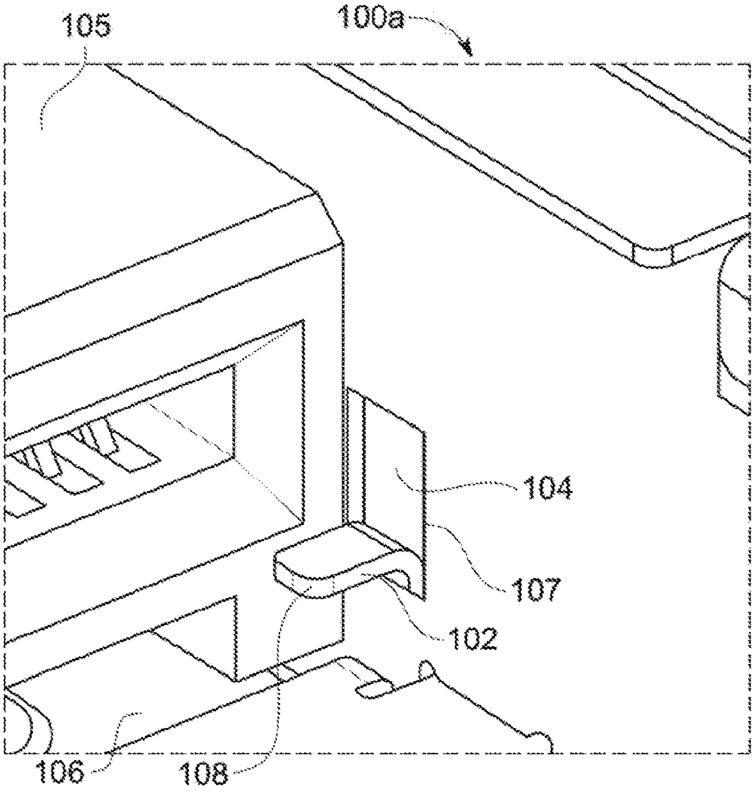
FIG. 25 depicts an enlarged view of an additional exemplary, respective alignment structure.

FIGS. 24 and 25 depict enlarged views of exemplary, respective top port alignment structures 102. In both figures, the alignment structures 102 are shown configured as integral to a sidewall 101 of top port 100*a*, though this is merely exemplary. Further, each structure 102 is shown comprising a portion 108 that extends or is bent inward and away from a sidewall 101, though again, this is merely exemplary. Thus, as an electrical component such as a module moves (e.g., is inserted) from one end of the top port 100*a* towards an opposite end it will encounter a structure 102 and be restricted from further movement towards the opposite end.

While only one top port alignment structure 102 is depicted in FIGS. 24 and 25 it should be understood that a respective assembly 100 may include more than one top port structure that is similarly configured. For example, each opposing sidewall (see sidewalls 101 in FIGS. 20 to 23) may include at least one top port alignment structure. In an embodiment, each of the alignment structures may be configured at a position on opposing sidewalls at a same distance from the one end of the top port 100*a* (e.g., first end 112), for example, such that as a moving component encounters the restricting force of both alignment structures at substantially the same time.

Also shown in FIGS. 24 and 25 are sidewall openings 107. In an embodiment a sidewall opening 107 in a respective sidewall 101 may be configured to have dimensions that allow a tool or machine to be inserted therein in order to extend or bend an alignment structure 102 inward to form portion 108. Said another way, in an embodiment, an alignment structure 102 may be in a same geometric plane as a sidewall (i.e., flat, not bent) when manufactured integral to a sidewall 101. Thus, a structure 102 would appear as filling a portion of an opening 107. Thereafter, a tool (or machine) may be used to bend structure 102 inward, for example. Similarly, when a structure 102 is not integral, an opening 107 allows a tool enough space to connect a structure 102 to a sidewall 101, for example. As mentioned previously, opening 107 may be covered by one or more different types of electromagnetic shielded and conductive plates 104 in order to maintain the electromagnetic shielding properties of the assembly 100.

Further, top port alignment structure 102 is shown comprising a portion 108 that extends or is bent inwards and away from sidewall 101, though again, this is merely exemplary. Thus, as a module from one end towards the opposite end it will encounter alignment structure 102 and be restricted from further movement towards the opposite end.

Figure 26:
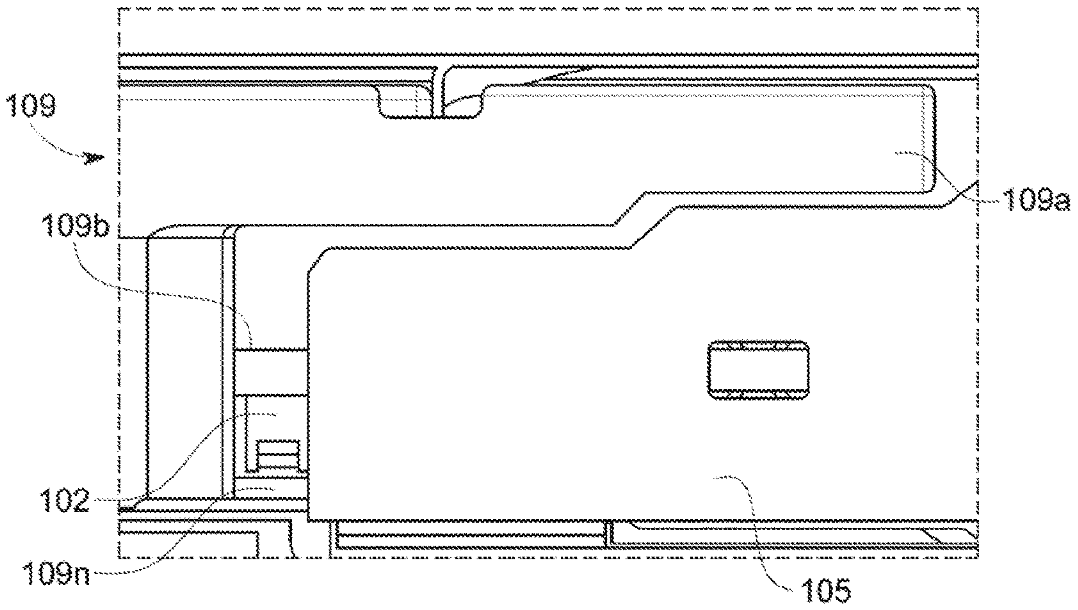
FIG. 26 depicts a side view of a module, receptacle connector and alignment structure within a top port of an exemplary assembly.
Figure 27:
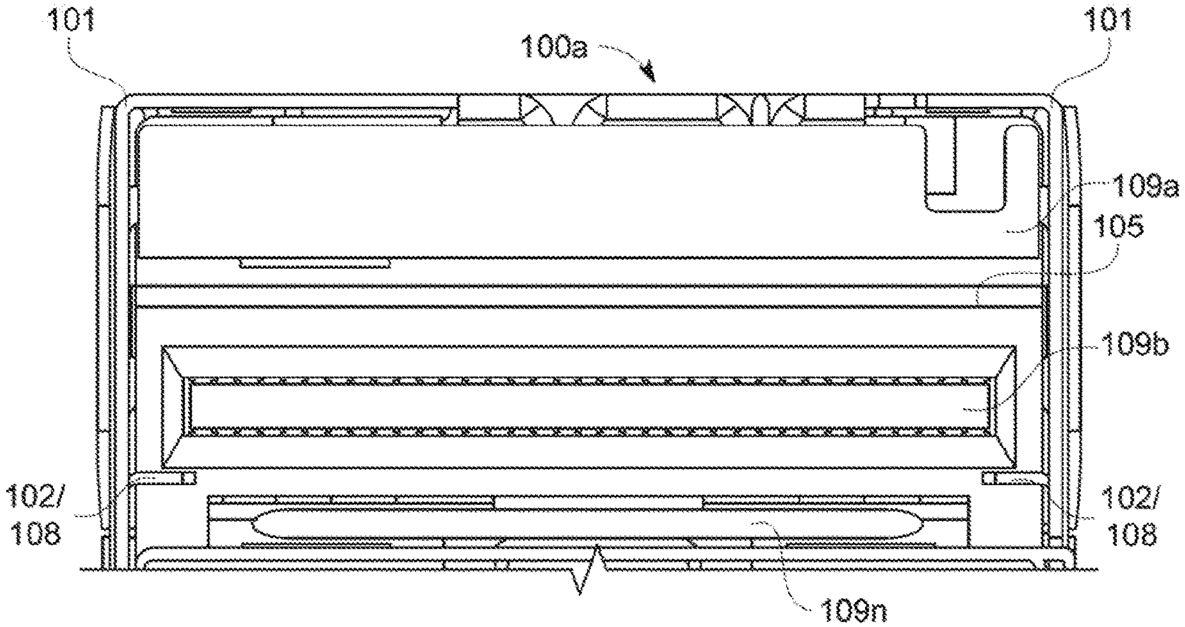
FIG. 27 depicts an edge view of a module, receptacle connector and alignment structure within a top port of an exemplary assembly.

Referring to FIGS. 26 and 27 there are depicted side and edge views, respectively, of a top port module 109, top port connector 105 and alignment structure 102 within top port 100*a* of exemplary assembly 100.

The module 109 may be shaped to include a number of top port extending portions 109*a*, 109*b* to 109*n*. Accordingly, in an embodiment, the alignment structure 102 may be positioned and shaped to apply a force to a portion of module 109 that restricts the module 109 from moving while at the same time allowing each extending portion 109*a*, 109*b* to 109*n* to make sufficient connection with the connector 105 to permit high-speed data signals to be transported from module 109 to connector 105 (or vice-versa) without damaging the connector 105. In more detail, structure 102 may be positioned and shaped as a part of the top port 100*a* of assembly 100 such that structure allows module 109 to make sufficient connection with the connector 105 but restricts module 109 from moving too far towards connector 105 to prevent damage to the connector 105, for example.

Up until now our discussion has assumed that an electronic component (e.g., module) is inserted correctly within the top port 100*a* of assembly 100. As noted previously, in practice electronic components may be inserted incorrectly. If so, the inserted components will most likely be misaligned which, in turn, will prevent an appropriate electrical connection to be made between one component inserted on one end and another component located at an opposite end of the assembly 100 (e.g., between a module and connector). To prevent such misalignments an assembly may include one or more of the inventive alignment structures described herein, such as structures 102.

Figure 28:
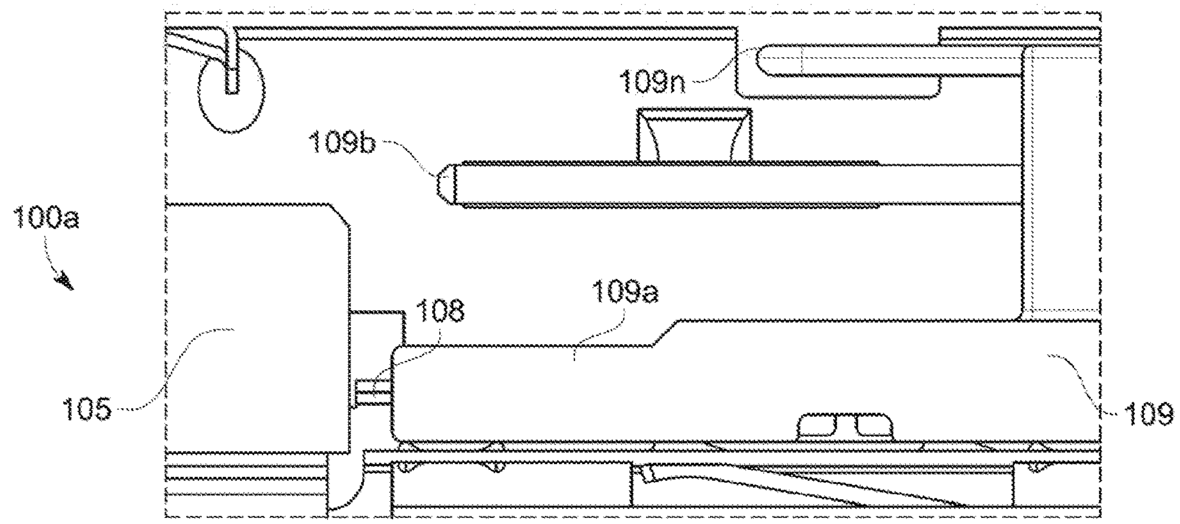
FIG. 28 depicts a side view of a module, receptacle connector and alignment structure within a top port of an exemplary assembly where the module has been inserted incorrectly.
Figure 29:
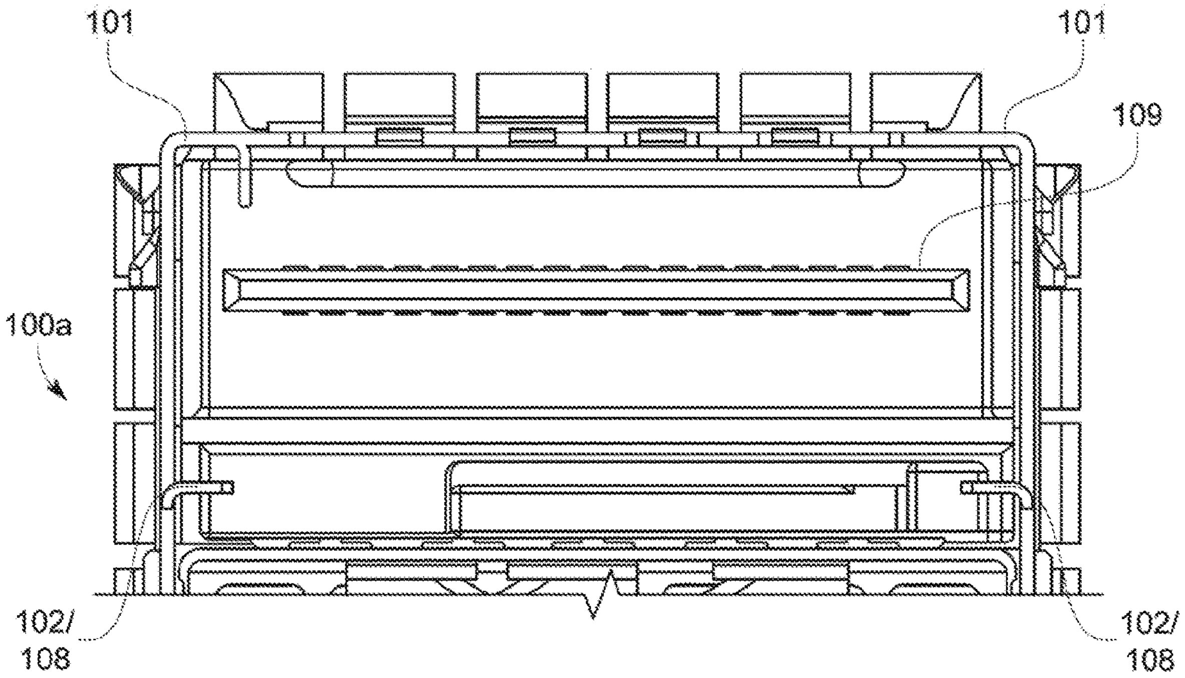
FIG. 29 depicts an edge view of a module, receptacle connector and alignment structure within a top port of an exemplary assembly where the module has been inserted incorrectly.

For example, FIGS. 28 and 29 depict a module 109 that has been inserted into the top port 100*a* of assembly 100 incorrectly (i.e., upside down). This may lead to damage to connector 105. However, because the top port 100*a* of assembly 100 includes one or more alignment structures 102 the misaligned module 109 may be restricted from moving past structures 102, thus damage to the connector 105 may be averted.

In FIGS. 20 to 29 the alignment structures are depicted as being positioned and shaped as part of a side wall of a top port 100*a* of a 2×1 cage assembly. However, such structures may be positioned and shaped as a part of the base 106 of the top port 100*a* or a top wall of a top. For example, in alternative embodiments FIGS. 30 to 33 depict a base 106 of a top port 100*a*, where the base 106 comprising at least one top port alignment structure 110 (e.g., tabs, a shaped blocking structure) that may, or may not be, integral to the base 106 to align, and/or at least assist in the alignment of, a module and to restrict the movement of a top port module, for example. In embodiments the structures 110 may be positioned at a midway point along the length of the base 106, for example.

For example, each structure 110 may be configured to restrict movement of a module similarly to similar structures as described above.

In an embodiment, the structures 110 may be integral to, or connected to (e.g., by welds) base 106 of the top port 100*a*, for example.

Each structure 110 may comprise a portion 114 that is bent angularly upward and away from base 106 and an end portion 115 that is parallel to a side wall 101 of the top port 100*a*, though again, this is merely exemplary. Thus, as an electrical component moves (e.g., is inserted) from one end towards an opposite end it will encounter one or structures 110 and be restricted from further movement towards the opposite end.

Figure 30:
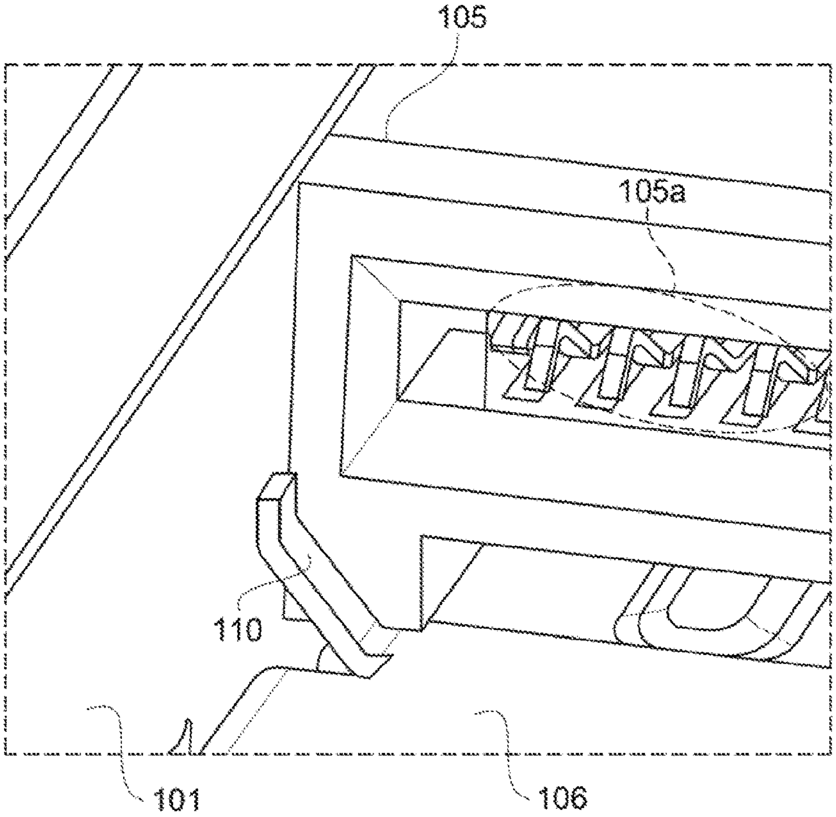
FIG. 30 depicts one or more alignment structures positioned and shaped as part of a base of a top port.
Figure 31:
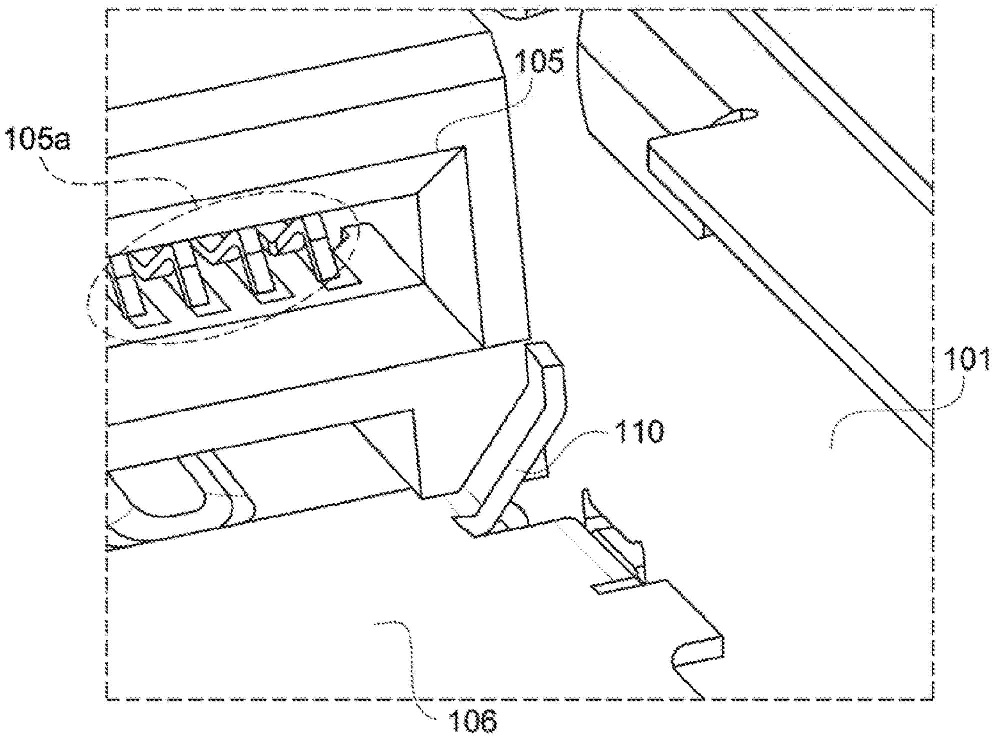
FIG. 31 depicts one or more additional alignment structures positioned and shaped as part of a base of a top port.

While only one alignment structure 110 is depicted in FIGS. 30, 31 it should be understood that a respective base 106 may include more than one structure that is similarly configured (an "additional" structure). Accordingly, in such a configuration where the base includes an additional structure 110, each top port alignment structure 110 may be configured at or on an opposing edge of base 106 (i.e., where the base 106 meets sidewall 101) at a position that is the same distance from one end of the top port 100*a*, for example, such that a moving component encounters the restricting force of both alignment structures at substantially the same time.

Figure 32:
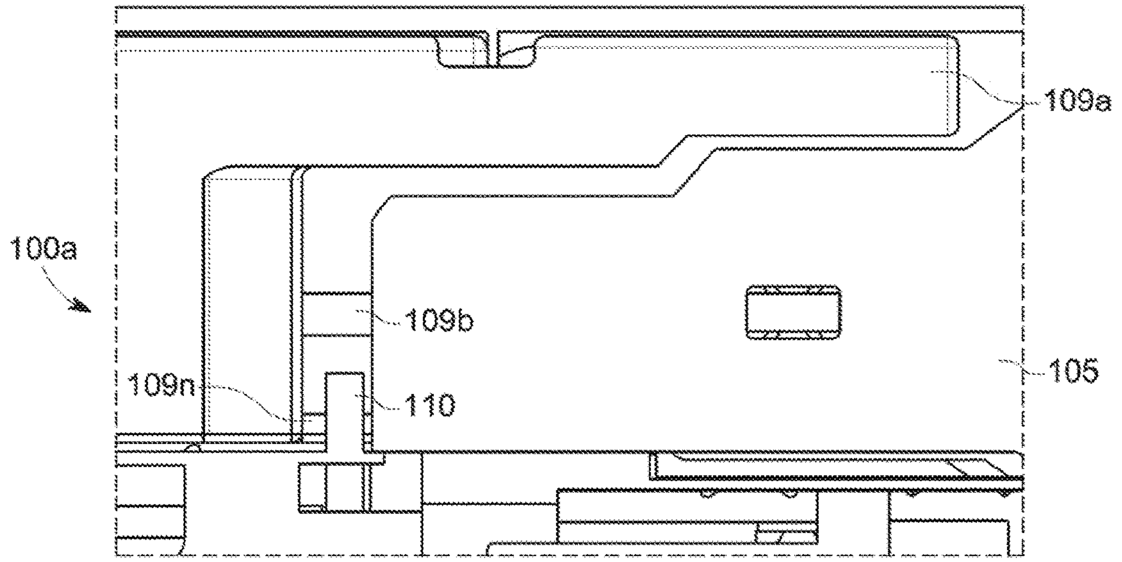
FIG. 32 depicts a side view of one or more alignment structures positioned and shaped as part of a base of a top port.
Figure 33:
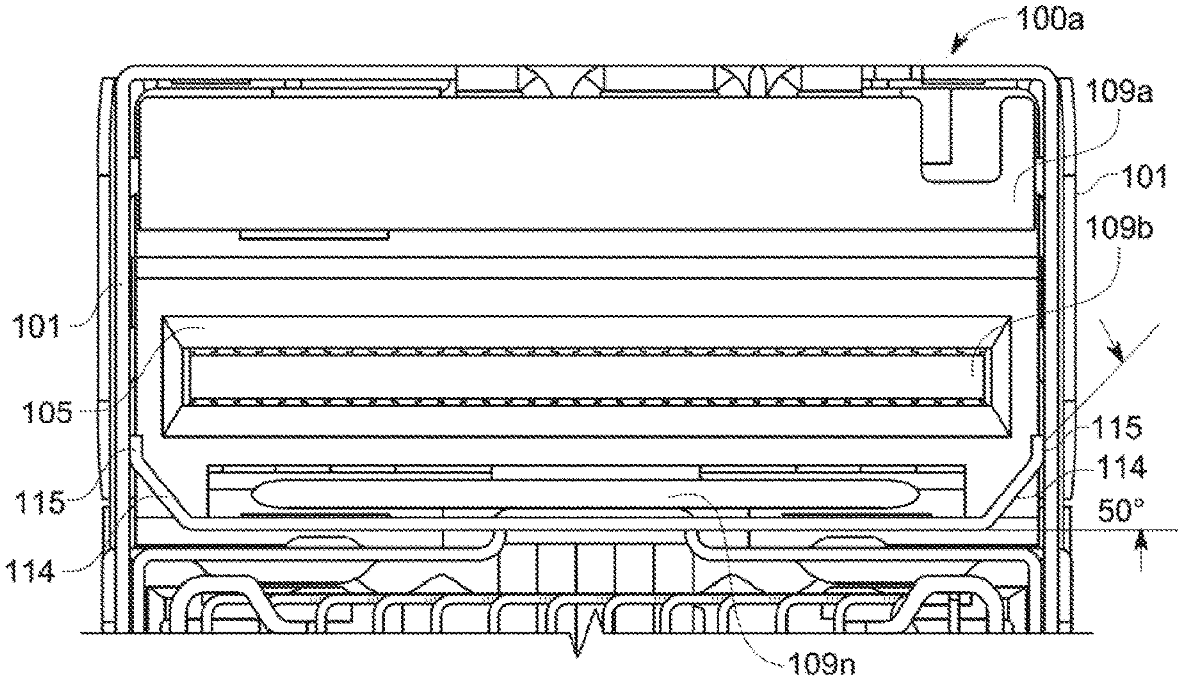
FIG. 33 depicts an edge view of one or more alignment structures positioned and shaped as part of a base of a top port.

Referring now to FIGS. 32 and 33 there are depicted a side view and front edge view, respectively, of a module 109 and connector 105 positioned in top port 100*a* of exemplary assembly 100 that includes one or more alignment structures 110. The module 109 may be shaped to include a number of extending portions 109*a*, 109*b* to 109*n*. Accordingly, in an embodiment, the alignment structures 110 may be positioned and shaped to apply a force to a portion of module 109 that restricts the module 109 from moving while at the same time allowing each extending portion 109*a*, 109*b* to 109*n* to make sufficient connection with the connector 105 to permit high-speed data signals to be transported from module 109 to connector 105 (or vice-versa) without damaging the connector 105 or module 109. In more detail, structures 110 may be positioned and shaped as a part of a top port 100*a* of assembly 100 such that structures allow module 109 to make sufficient connection with the connector 105 (a second electronic component) but restricts module 109 from moving too far towards connector 105 to prevent damage to the connector 105, for example.

Figure 34:
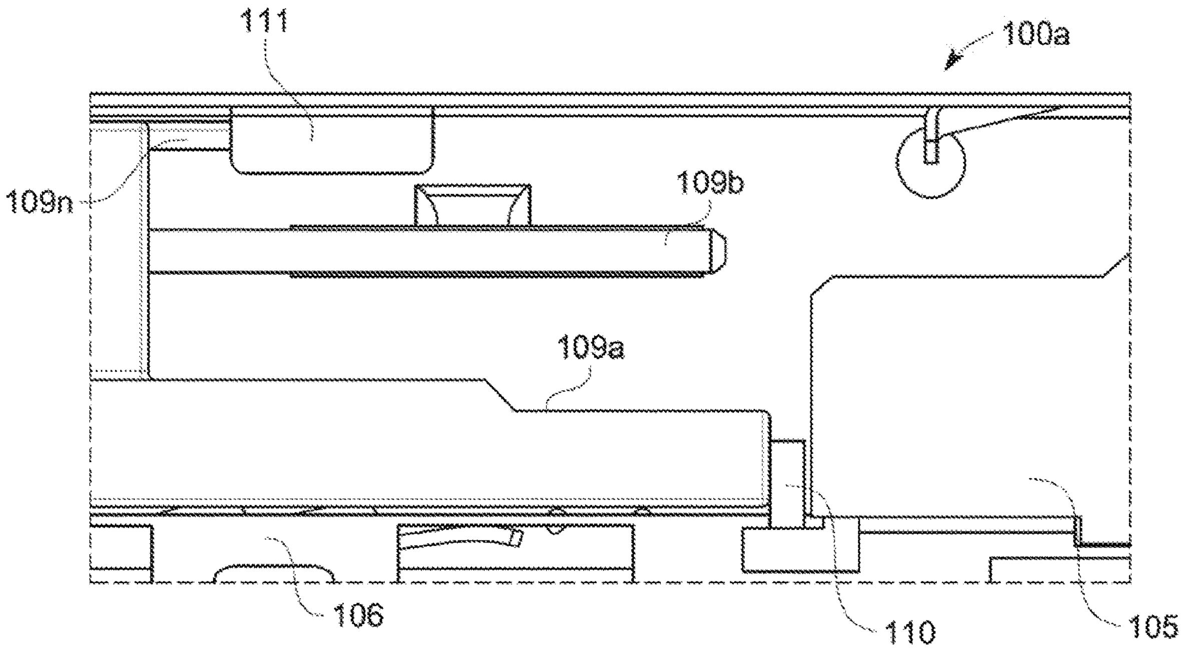
FIG. 34 depicts a side view of a module incorrectly inserted into a top port of an assembly.
Figure 35:
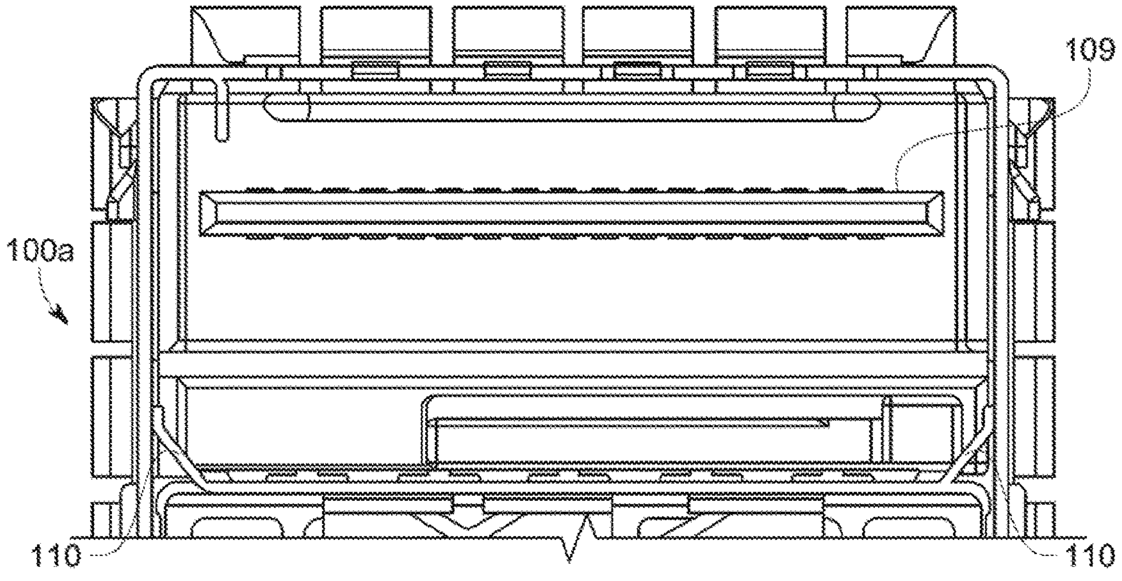
FIG. 35 depicts an edge view of a module incorrectly inserted into a top port of an assembly.

While FIGS. 32 and 33 depict a module 109 inserted correctly into top port 100*a*, FIGS. 34 and 35 depict views of the same module inserted incorrectly (i.e., upside down). Such an incorrect insertion will mostly likely lead to a misalignment of module and connector. To prevent such misalignments the top port 100*a* may include one or more of the inventive alignment structures described herein, such as structures 110. Accordingly, because top port 100*a* includes one or more alignment structures 110 the misaligned module 109 is restricted from moving past structures 110, thus damage to the connector 105 may be averted.

While benefits, advantages, and solutions have been described above with regard to specific embodiments of the present invention, it should be understood that any component(s) that may cause or result in such benefits, advantages, or solutions to become more pronounced are not to be construed as a critical, required, or an essential feature or element of any or all the claims appended to the present disclosure or that result from the present disclosure.

Further, the disclosure provided herein describes features in terms of specific exemplary embodiments. However, numerous additional embodiments and modifications within the scope and spirit of the appended claims will occur to persons of ordinary skill in the art from a review of this disclosure and are intended to be covered by the disclosure and appended claims. Accordingly, this disclosure includes all such additional embodiments, modifications and equivalents of the subject matter recited in the claims appended hereto as permitted by applicable law. Moreover, any combination of the above-described components in all possible variations thereof is encompassed by the disclosure unless otherwise indicated herein or otherwise clearly contradicted by context.

We claim:

1. An assembly, comprising:

a module configured to be inserted into the assembly;

a connector configured to be inserted into the assembly;

an electromagnetically shielded and conductive cover comprising opposing sidewalls, where one or more of the opposing sidewalls comprises at least one alignment structure configured to restrict movement of the module; and an electromagnetically shielded and conductive base attached to the electromagnetically shielded and conductive cover, wherein:

the module comprises at least one extending portion;

the at least one alignment structure comprises at least one protrusion which is formed by bending inward a part of at least one of the opposing sidewalls; and on a condition that the module is inserted incorrectly into the assembly, the at least one protrusion restricts the at least one extending portion of the module from moving past the at least one protrusion and prevents an electrical connection between the module and the connector.

2. The assembly as in claim 1, wherein the at least one alignment structure is further configured to restrict movement of the module to prevent damage to the module or to the connector.

3. The assembly as in claim 1, wherein the at least one alignment structure is further configured to restrict movement of the module to prevent misalignment of the module.

4. The assembly as in claim 1, wherein the assembly comprises a 1×1 cage assembly, the 1×1 cage assembly comprising a single-port connector cage assembly configured to accept a single module.

5. The assembly as in claim 1, wherein the assembly comprises a lower port of a 2×1 cage assembly, the 2×1 cage assembly comprising a dual-port connector cage assembly configured to accept two modules.

6. The assembly as in claim 1, wherein on a condition that the module is inserted correctly into the assembly, the at least one protrusion restricts the module from moving past the at least one protrusion and allows a different extending portion of the module to make an electrical connection with the connector.

7. The assembly as in claim 1, wherein the at least one alignment structure comprises a structure integral to one of the opposing sidewalls.

8. The assembly as in claim 1, wherein as the module moves from one end of the assembly towards an opposite end of the assembly, the at least one alignment structure restricts movement of the module towards the opposite end.

9. The assembly as in claim 1, wherein the at least one alignment structure comprises an alignment structure for each opposing sidewall, wherein each alignment structure is configured at a position at a same distance from one end of the assembly.

10. The assembly as in claim 1, wherein each opposing sidewall comprises an opening covered by a sidewall of the conductive base to maintain electromagnetic shielding properties of the assembly.

11. The assembly as in claim 1, wherein the at least one alignment structure is positioned and shaped to apply a force to a portion of the module to restrict the module from moving while at the same time allowing the module to make connection with the connector to permit high-speed data signals to be transported from the module to the connector or vice-versa without damaging either the module or the connector.

12. An assembly, comprising:

an electromagnetically shielded and conductive base comprising a bottom wall, the bottom wall comprising at least one alignment structure configured to restrict movement of a first one of a plurality of electronic components, the first one of the plurality of electronic components comprising at least one extending portion; and an electromagnetically shielded and conductive cover, wherein:

the at least one alignment structure comprises at least one protrusion which is formed by bending inward a part of the bottom wall; and on a condition that the first one of the plurality of electronic components is inserted incorrectly into the assembly, the at least one protrusion restricts the at least one extending portion of the first one of the plurality of electronic components from moving past the at least one protrusion and prevents an electrical connection between the first one of the plurality of electronic components and a second one of the plurality of electronic components.

13. The assembly as in claim 12, wherein, the at least one alignment structure is further configured to restrict movement of the first one of the plurality of electronic components to prevent damage to the first one of the plurality of electronic components or to the second one of the plurality of electronic components.

14. The assembly as in claim 12, wherein the first one of the plurality of electronic components comprises a module; and the at least one alignment structure is further configured to restrict movement of the first one of the plurality of electronic components to prevent damage to the module or to the second one of the plurality of electronic components.

15. The assembly as in claim 12, wherein the at least one alignment structure is further configured to restrict movement of the first one of the plurality of electronic components to prevent misalignment of the first one of the plurality of electronic components with the second one of the plurality of electronic components.

16. The assembly as in claim 12, wherein the assembly comprises a 1×1 cage assembly, the 1×1 cage assembly comprising a single-port connector cage assembly configured to accept a single module.

17. The assembly as in claim 12, wherein the assembly comprises a lower port of a 2×1 cage assembly, the 2×1 cage assembly comprising a dual-port connector cage assembly configured to accept two modules.

18. The assembly as in claim 12, wherein on a condition that the first one of the plurality of electronic components is inserted correctly, the at least one protrusion restricts the first one of the plurality of electronic components from moving past the at least one protrusion and allows the at least one extending portion of the first one of the plurality of electronic components to make an electrical connection with the second one of the plurality of electronic components.

19. The assembly as in claim 12, wherein the at least one alignment structure comprises a structure integral to the bottom wall.

20. The assembly as in claim 12, wherein the at least one alignment structure comprises a portion that extends upward and away from the bottom wall, and wherein as the first one of the plurality of electronic components moves from one end of the assembly towards an opposite end of the assembly, the at least one alignment structure restricts movement of the first one-of the plurality of electronic components towards the opposite end.

* * * * *